(12) United States Patent
Lin

(10) Patent No.: US 10,499,298 B2
(45) Date of Patent: Dec. 3, 2019

(54) MOBILE TERMINAL CONTROL METHOD AND MOBILE TERMINAL

(71) Applicant: Huawei Technologies Co., Ltd., Shenzhen, Guangdong (CN)

(72) Inventor: Bo Lin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/180,651

(22) Filed: Nov. 5, 2018

(65) Prior Publication Data

US 2019/0075502 A1 Mar. 7, 2019

Related U.S. Application Data

(63) Continuation of application No. 15/473,407, filed on Mar. 29, 2017, now Pat. No. 10,142,904, which is a
(Continued)

(51) Int. Cl.
| | |
|---|---|
| *H04W 36/18* | (2009.01) |
| *H04W 36/34* | (2009.01) |
| *H04W 76/28* | (2018.01) |
| *H04W 36/00* | (2009.01) |
| *H04W 36/32* | (2009.01) |

(Continued)

(52) U.S. Cl.
CPC ....... *H04W 36/18* (2013.01); *H04W 36/0094* (2013.01); *H04W 36/32* (2013.01); *H04W 36/34* (2013.01); *H04W 36/36* (2013.01); *H04W 74/0833* (2013.01); *H04W 76/28* (2018.02)

(58) Field of Classification Search
CPC . H04W 36/18; H04W 74/0833; H04W 36/36; H04W 36/32; H04W 36/0094; H04W 76/28; H04W 36/34

USPC ......... 455/436–439, 442–444, 115.1, 115.3, 455/226.1–2; 370/331, 332
See application file for complete search history.

(56) References Cited

U.S. PATENT DOCUMENTS

| | | | |
|---|---|---|---|
| 2007/0224992 | A1 | 9/2007 | Dalsgaard et al. |
| 2011/0105119 | A1 | 5/2011 | Bienas et al. |

(Continued)

FOREIGN PATENT DOCUMENTS

| | | |
|---|---|---|
| CN | 1859784 A | 11/2006 |
| CN | 101170830 A | 4/2008 |

(Continued)

OTHER PUBLICATIONS

Mediatek Inc, "Mobility Enhancements," 3GPP TSG RAN Meeting #66, RP-140702, Sophia Antipolis, France, Jun. 10-13, 2014, 8 pages.

*Primary Examiner* — Congvan Tran
(74) *Attorney, Agent, or Firm* — Huawei Technologies Co., Ltd.

(57) ABSTRACT

Embodiments of the present invention provide a mobile terminal control method and a mobile terminal. When initiating connection establishment to an access network element corresponding to a target cell, a mobile terminal can at least skip sending, to an access network element corresponding to a serving cell, a measurement report of a measurement reporting event corresponding to indication information, and directly initiate connection establishment to the access network element corresponding to the target cell, so that the mobile terminal can initiate, in a timely manner, connection establishment to the access network element corresponding to the target cell.

16 Claims, 26 Drawing Sheets

Related U.S. Application Data continuation of application No. PCT/CN2014/088061, filed on Sep. 30, 2014.

(51) Int. Cl.
*H04W 36/36* (2009.01)
*H04W 74/08* (2009.01)

(56) References Cited

U.S. PATENT DOCUMENTS

| | | |
|---|---|---|
| 2011/0269462 A1 | 11/2011 | Sagfors et al. |
| 2013/0196659 A1* | 8/2013 | Damji ............... H04W 52/0225 455/434 |
| 2014/0045494 A1 | 2/2014 | Pekonen et al. |
| 2014/0086173 A1 | 3/2014 | Sadeghi et al. |
| 2014/0112180 A1 | 4/2014 | Axmon et al. |
| 2014/0334371 A1* | 11/2014 | Kim ................. H04W 52/0206 370/311 |
| 2014/0349694 A1 | 11/2014 | Raghothaman et al. |
| 2015/0079991 A1 | 3/2015 | Koskinen et al. |
| 2015/0181493 A1 | 6/2015 | Park et al. |
| 2015/0257066 A1 | 9/2015 | Salkintzis |
| 2015/0257111 A1 | 9/2015 | Larsson et al. |
| 2016/0112918 A1 | 4/2016 | Wen |
| 2016/0286424 A1 | 9/2016 | Li et al. |
| 2017/0041841 A1 | 2/2017 | Pedersen et al. |

FOREIGN PATENT DOCUMENTS

| | | |
|---|---|---|
| CN | 101742587 A | 6/2010 |
| CN | 102300274 A | 12/2011 |
| CN | 103188734 A | 7/2013 |
| CN | 103781136 A | 5/2014 |
| CN | 103797849 A | 5/2014 |
| WO | 2006089456 A1 | 8/2006 |
| WO | 2013038052 A1 | 3/2013 |
| WO | 2013177778 A1 | 12/2013 |

* cited by examiner

MOBILE TERMINAL CONTROL METHOD AND MOBILE TERMINAL

CROSS-REFERENCE TO RELATED APPLICATIONS

This application is a continuation of U.S. application Ser. No. 15/473,407, filed on Mar. 29, 2017, which is a continuation of International Application No. PCT/CN2014/088061, filed on Sep. 30, 2014. All of the afore-mentioned patent applications are hereby incorporated by reference in their entireties.

TECHNICAL FIELD

Embodiments of the present invention relate to the field of communications technologies, and in particular, to a mobile terminal control method and a mobile terminal.

BACKGROUND

Currently, a mobile terminal and life of a user are closely related to each other. Usually, the user performs a communication service such as chat by using the mobile terminal while being on a vehicle such as a bus or a subway. In this case, the mobile terminal also moves at high speed as the vehicle moves. Because the mobile terminal moves at relatively high speed, in terms of a physical location, after the mobile terminal enters from a coverage area of a previous serving cell to a coverage area of a new cell, quality of a communication service provided by the serving cell is deteriorated. In addition, because the mobile terminal cannot establish a connection to the new cell in a timely manner either, mobility of the mobile terminal is affected. For example, because the quality of the communication service provided by the serving cell is deteriorated, and the mobile terminal cannot establish a connection to the new cell in a timely manner either, a communication service currently performed by the mobile terminal is interrupted.

Specifically, before establishing a connection to an access network element corresponding to the new cell, the mobile terminal needs to send a measurement report about the new cell to an access network element corresponding to the serving cell. The mobile terminal may establish a connection to a new cell only when the mobile terminal receives an indication that connection establishment is allowed and that is sent by the access network element corresponding to the serving cell. It may be understood that, by using the prior art, the mobile terminal needs to wait for a relatively long time period from discovering the new cell to establishing a connection to the new cell, and cannot establish a connection to the new cell in a timely manner to obtain a communication service provided by the new cell. Particularly, when the mobile terminal is in a discontinuous reception (DRX) state, an interval at which the mobile terminal measures the serving cell and an interval at which the mobile terminal measures the new cell become longer. For example, when a DRX cycle is 320 ms, and the mobile terminal needs to spend 5 times the DRX cycle performing radio resource management (RRM) measurement on a neighboring cell, the mobile terminal needs to spend a longer time period from discovering a new cell to establishing a connection to the new cell, and mobility of the mobile terminal cannot meet a basic requirement of the user. Therefore, how the mobile terminal establishes a connection to a new cell in a timely manner is an important aspect of improving performance of the mobile terminal.

SUMMARY

Embodiments of the present invention provide a mobile terminal control method and a mobile terminal, so as to improve mobility of the mobile terminal.

According to a first aspect, an embodiment of the present invention provides a processing method for establishing a connection to an access network element by a mobile terminal, and the method includes:

measuring, by a mobile terminal, a target cell according to measurement configuration information, so as to obtain a measurement result of the target cell, where the measurement configuration information is obtained by the mobile terminal, by using a radio resource control RRC connection established between the mobile terminal and an access network element corresponding to a serving cell, from the access network element corresponding to the serving cell; and initiating, by the mobile terminal, connection establishment to an access network element corresponding to the target cell when the mobile terminal determines, according to the measurement result and indication information, that the measurement result meets an entering condition of a measurement reporting event corresponding to the indication information, where the indication information is used to instruct the mobile terminal to initiate connection establishment to the access network element corresponding to the target cell if the measurement result meets the entering condition of the measurement reporting event corresponding to the indication information; or initiating, by the mobile terminal, connection establishment to an access network element corresponding to the target cell when the mobile terminal generates a measurement report according to the measurement result, and the mobile terminal determines that the measurement report is a measurement report of a measurement reporting event corresponding to indication information, where the indication information is used to instruct the mobile terminal to initiate connection establishment to the access network element corresponding to the target cell if the mobile terminal generates the measurement report of the measurement reporting event corresponding to the indication information; or initiating, by the mobile terminal, connection establishment to an access network element corresponding to the target cell when the mobile terminal determines, according to the measurement result and indication information, that the measurement result meets an entering condition of a measurement reporting event corresponding to the indication information, and when the mobile terminal generates a measurement report of the measurement reporting event corresponding to the indication information, where the indication information is used to instruct the mobile terminal to initiate connection establishment to the access network element corresponding to the target cell if the measurement result meets the entering condition of the measurement reporting event corresponding to the indication information and the mobile terminal generates the measurement report of the measurement reporting event corresponding to the indication information, where the indication information is obtained by the mobile terminal in advance from the access network element corresponding to the serving cell.

According to a second aspect, an embodiment of the present invention provides a method for controlling a DRX state of a mobile terminal, and the method includes:

performing, by a mobile terminal, radio link monitoring RLM on a serving cell according to a downlink reference signal of the serving cell, so as to obtain quality of a downlink radio link of the serving cell; and when the mobile terminal determines, by estimating the quality of the downlink radio link, that a quantity of times in which consecutive out-of-synchronization indications occur in the downlink radio link reaches a preset threshold, starting, by the mobile terminal, a timer, and before the timer expires, transitioning the mobile terminal from a DRX state to a non-DRX state, or transitioning the mobile terminal from a long-cycle DRX state to a short-cycle DRX state, or shortening a cycle of the DRX state.

According to a third aspect, an embodiment of the present invention provides a mobile terminal, and the mobile terminal includes:

a measurement module, configured to measure a target cell according to measurement configuration information, so as to obtain a measurement result of the target cell, where the measurement configuration information is obtained by the mobile terminal, by using a radio resource control RRC connection established between the mobile terminal and an access network element corresponding to a serving cell, from the access network element corresponding to the serving cell; and a processing module, configured to: initiate connection establishment to an access network element corresponding to the target cell when determining, according to the measurement result and indication information, that the measurement result meets an entering condition of a measurement reporting event corresponding to the indication information, where the indication information is used to instruct the processing module to initiate connection establishment to the access network element corresponding to the target cell if the measurement result meets the entering condition of the measurement reporting event corresponding to the indication information; or initiate connection establishment to an access network element corresponding to the target cell when generating a measurement report according to the measurement result, and determining that the measurement report is a measurement report of a measurement reporting event corresponding to indication information, where the indication information is used to instruct the processing module to initiate connection establishment to the access network element corresponding to the target cell if the processing module generates the measurement report of the measurement reporting event corresponding to the indication information; or initiate connection establishment to an access network element corresponding to the target cell when determining, according to the measurement result and indication information, that the measurement result meets an entering condition of a measurement reporting event corresponding to the indication information, and the processing module generates a measurement report of the measurement reporting event corresponding to the indication information, where the indication information is used to instruct the processing module to initiate connection establishment to the access network element corresponding to the target cell if the measurement result meets the entering condition of the measurement reporting event corresponding to the indication information and the processing module generates the measurement report of the measurement reporting event corresponding to the indication information, where the indication information is obtained by the processing module in advance from the access network element corresponding to the serving cell.

According to a fourth aspect, an embodiment of the present invention provides a mobile terminal, and the mobile terminal includes:

an obtaining module, configured to perform radio link monitoring RLM on a serving cell according to a downlink reference signal of the serving cell, so as to obtain quality of a downlink radio link of the serving cell; and a processing module, configured to: when determining, by estimating the quality of the downlink radio link, that a quantity of times in which consecutive out-of-synchronization indications occur in the downlink radio link reaches a preset threshold, start a timer, and before the timer expires, transition the mobile terminal from a DRX state to a non-DRX state, or transition the mobile terminal from a long-cycle DRX state to a short-cycle DRX state, or shorten a cycle of the DRX state.

According to the mobile terminal control method and the mobile terminal that are provided in the embodiments of the present invention, indication information is used to instruct a mobile terminal to initiate connection establishment to an access network element corresponding to a target cell if a measurement result meets an entering condition of a measurement reporting event corresponding to the indication information; or is used to instruct a mobile terminal to initiate connection establishment to an access network element corresponding to a target cell if the mobile terminal generates a measurement report of a measurement reporting event corresponding to the indication information; or is used to instruct a mobile terminal to initiate connection establishment to an access network element corresponding to a target cell if a measurement result meets an entering condition of a measurement reporting event corresponding to the indication information and the mobile terminal generates a measurement report of the measurement reporting event corresponding to the indication information. Therefore, when initiating connection establishment to the access network element corresponding to the target cell, the mobile terminal can at least skip sending, to an access network element corresponding to a serving cell, the measurement report of the measurement reporting event corresponding to the indication information, and directly initiate connection establishment to the access network element corresponding to the target cell, so that the mobile terminal can initiate, in a timely manner, connection establishment to the access network element corresponding to the target cell, and mobility of the mobile terminal is improved.

DETAILED DESCRIPTION

Figure 1:
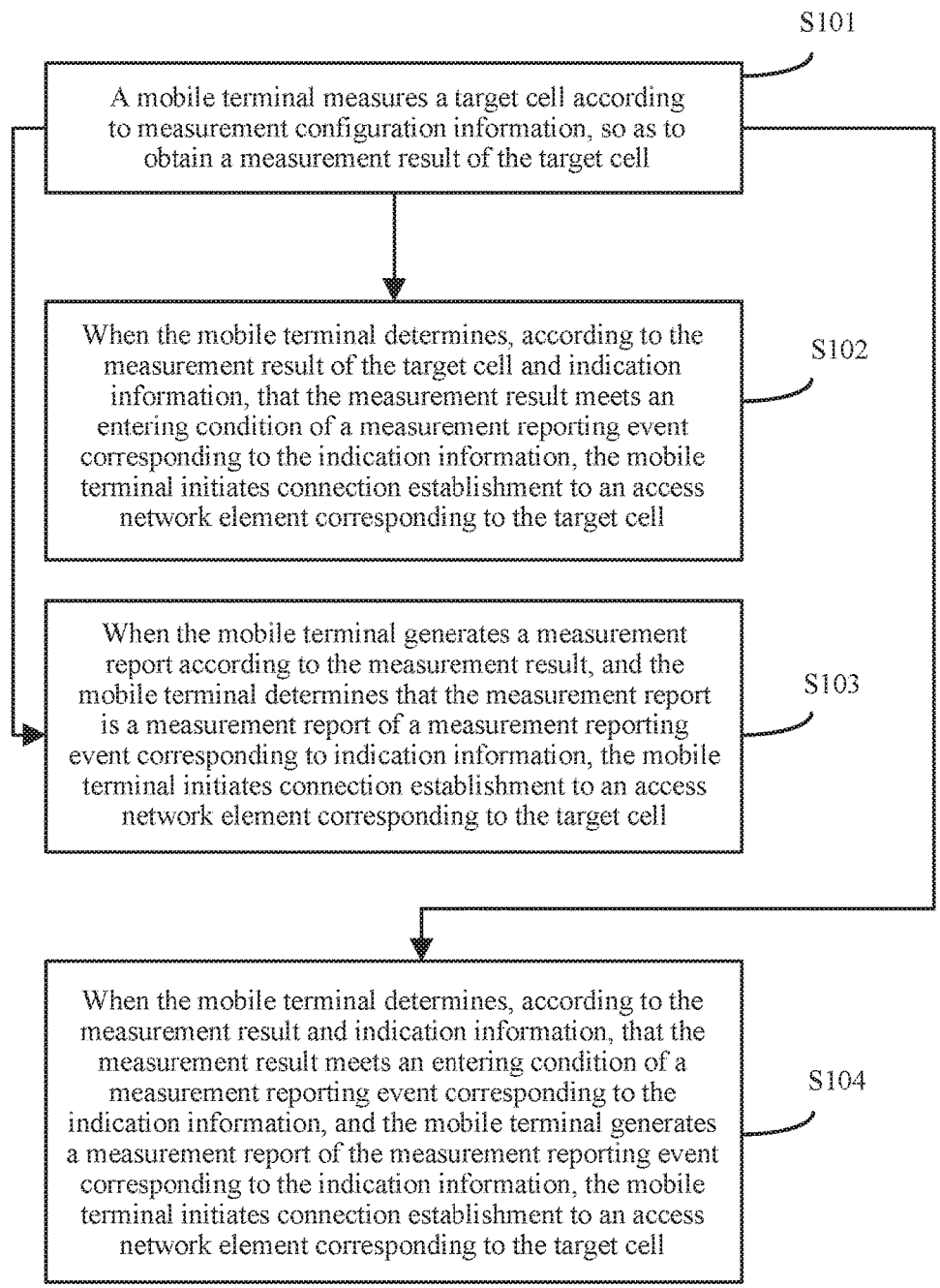
FIG. 1 is a schematic flowchart of Embodiment 1 of a processing method for establishing a connection to an access network element by a mobile terminal according to the present invention.

FIG. 1 is a schematic flowchart of Embodiment 1 of a processing method for establishing a connection to an access network element by a mobile terminal according to the present invention. As shown in FIG. 1, this embodiment is executed by a mobile terminal, and specifically includes the following steps.

S101. The mobile terminal measures a target cell according to measurement configuration information, so as to obtain a measurement result of the target cell.

The mobile terminal establishes an RRC (radio resource control) connection to a serving cell, and the measurement configuration information is obtained by the mobile terminal, by using the RRC connection, from an access network element (which may be specifically a base station that manages the serving cell) corresponding to the serving cell. Specifically, the measurement configuration information includes a configuration about a measurement reporting event and the measurement reporting event may be specifically an event A3, an event A4, an event A5, or the like.

Specifically, the mobile terminal performs RRM measurement on the target cell according to the measurement configuration information, so as to obtain an RRM measurement result. The target cell may be a neighboring cell of the serving cell, or may be a corresponding cell. When the target cell is a corresponding cell, the mobile terminal needs to obtain an identity of the corresponding cell from the serving cell before the mobile terminal performs measurement.

S102. When the mobile terminal determines, according to the measurement result of the target cell and indication information, that the measurement result meets an entering condition of a measurement reporting event corresponding to the indication information, the mobile terminal initiates connection establishment to an access network element corresponding to the target cell.

The indication information is used to instruct the mobile terminal to initiate connection establishment to the access network element corresponding to the target cell if the measurement result meets the entering condition of the measurement reporting event corresponding to the indication information.

By performing S102, the mobile terminal skips generating a measurement report of the measurement reporting event corresponding to the indication information, skips sending, to the access network element corresponding to the serving cell, the measurement report of the measurement reporting event corresponding to the indication information, and initiates connection establishment to the access network element corresponding to the target cell, so that the mobile terminal can initiate, in a timely manner, connection establishment to the access network element corresponding to the target cell, and mobility of the mobile terminal is improved.

Alternatively, after performing S101, the mobile terminal chooses to perform S103 instead of S102.

S103. When the mobile terminal generates a measurement report according to the measurement result, and the mobile terminal determines that the measurement report is a measurement report of a measurement reporting event corresponding to indication information, the mobile terminal initiates connection establishment to an access network element corresponding to the target cell.

The indication information is used to instruct the mobile terminal to initiate connection establishment to the access network element corresponding to the target cell if the mobile terminal generates the measurement report of the measurement reporting event corresponding to indication information.

By performing S103, the mobile terminal skips sending, to the access network element corresponding to the serving cell, the measurement report of the measurement reporting event corresponding to the indication information, and initiates connection establishment to the access network element corresponding to the target cell, so that the mobile terminal can initiate, in a timely manner, connection establishment to the access network element corresponding to the target cell, and mobility of the mobile terminal is improved.

Alternatively, after performing S101, the mobile terminal chooses to perform S104 instead of S102 and S103.

S104. When the mobile terminal determines, according to the measurement result and indication information, that the measurement result meets an entering condition of a measurement reporting event corresponding to the indication information, and the mobile terminal generates a measurement report of the measurement reporting event corresponding to the indication information, the mobile terminal initiates connection establishment to an access network element corresponding to the target cell.

The indication information is used to instruct the mobile terminal to initiate connection establishment to the access network element corresponding to the target cell if the measurement result meets the entering condition of the measurement reporting event corresponding to the indication information and the mobile terminal generates the measurement report of the measurement reporting event corresponding to the indication information.

By performing S104, the mobile terminal skips sending, to the access network element corresponding to the serving cell, the measurement report of the measurement reporting event corresponding to the indication information, and initiates connection establishment to the access network element corresponding to the target cell, so that the mobile terminal can initiate, in a timely manner, connection establishment to the access network element corresponding to the target cell, and mobility of the mobile terminal is improved.

In any one step of the foregoing S102, S103, or S104, the indication information is obtained by the mobile terminal in advance from the access network element corresponding to the serving cell. Optionally, the mobile terminal receives, by using the RRC connection, the indication information sent by the access network element corresponding to the serving cell. Specifically, the access network element corresponding to the serving cell may deliver the indication information while delivering the measurement configuration information to the mobile terminal, or may deliver the indication information to the mobile terminal before this embodiment is executed. In this embodiment, an example in which the measurement reporting event is the event A3 or the event A4 is used. When the measurement reporting event is specifically the event A3, the entering condition of the measurement reporting event is: "Mn+Ofn+Ocn−Hys>Ms+Ofs+Ocs+Off". When the measurement reporting event is specifically the event A4, the entering condition of the measurement reporting event is: "Mn+Ofn+Ocn−Hys>Thresh". Mn is the measurement result of the target cell, Ofn is a frequency specific offset of the target cell, and Ocn is a cell individual offset of the target cell. If the target cell is not configured with the cell individual offset, when the formulas are applied, a value of Ocn may be 0. Ms is a measurement result of the serving cell, Ofs is a frequency specific offset of the serving cell, Ocs is a cell individual offset of the serving cell, Hys is an event hysteresis parameter, Off is an event offset parameter, and Thresh is an event threshold parameter. Parameters such as Ofn, Ocn, Hys, Ofs, Ocs, and Off are obtained by the mobile terminal in advance.

Specifically, in communication transmission, the indication information is specifically at least one piece of data. The at least one piece of data includes an identifier of the measurement reporting event. For example, if the at least one piece of data includes an identifier "A3", it indicates that the measurement reporting event corresponding to the indication information is the event A3. Alternatively, the at least one piece of data is specifically a specific identifier. The specific identifier may be located in measurement configuration information, and is associated with the configuration about the measurement reporting event in the measurement configuration information. For example, if partial content of the measurement configuration information is a configuration about the event A3, and the specified identifier is associated with the configuration about the event A3 in the measurement configuration information, it may indicate that the measurement reporting event corresponding to the indication information is the event A3.

Possibly, there is at least one piece of the indication information, and there is at least one measurement reporting event corresponding to the indication information.

Optionally, the indication information may be specifically a direct re-establishment indication, a cell update indication, or a forward handover indication.

In this embodiment, indication information is used to instruct a mobile terminal to initiate connection establishment to an access network element corresponding to a target cell if a measurement result meets an entering condition of a measurement reporting event corresponding to the indication information; or is used to instruct a mobile terminal to initiate connection establishment to an access network element corresponding to a target cell if the mobile terminal generates a measurement report of a measurement reporting event corresponding to the indication information; or is used to instruct a mobile terminal to initiate connection establishment to an access network element corresponding to a target cell if a measurement result meets an entering condition of a measurement reporting event corresponding to the indication information and the mobile terminal generates a measurement report of the measurement reporting event corresponding to the indication information. Therefore, when initiating connection establishment to the access network element corresponding to the target cell, the mobile terminal can at least skip sending, to an access network element corresponding to a serving cell, the measurement report of the measurement reporting event corresponding to the indication information, and directly initiate connection establishment to the access network element corresponding to the target cell, so that the mobile terminal can initiate, in a timely manner, connection establishment to the access network element corresponding to the target cell, and mobility of the mobile terminal is improved.

Figure 2:
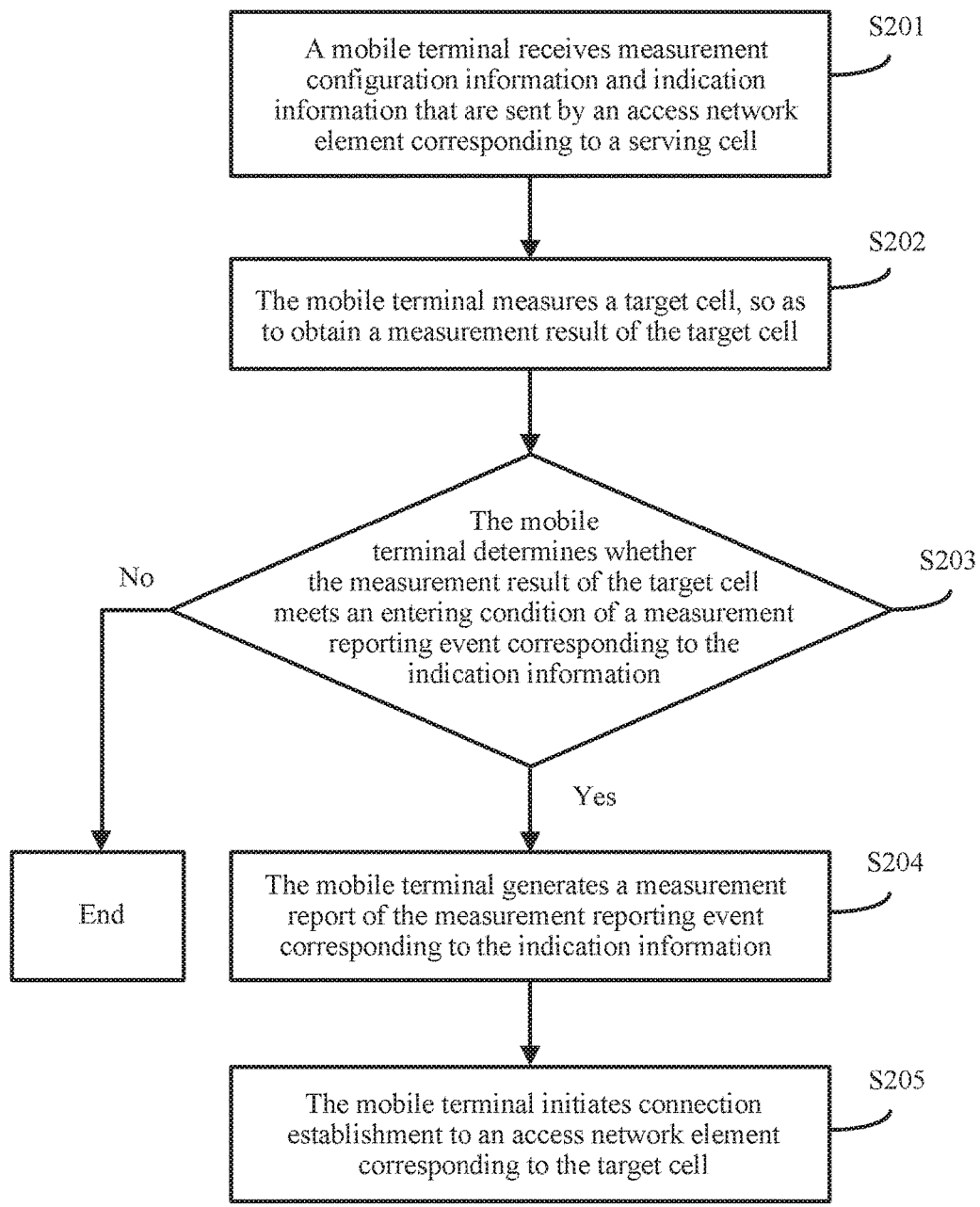
FIG. 2 is a schematic flowchart of Embodiment 2 of a processing method for establishing a connection to an access network element by a mobile terminal according to the present invention.

FIG. 2 is a schematic flowchart of Embodiment 2 of a processing method for establishing a connection to an access network element by a mobile terminal according to the present invention. As shown in FIG. 2, on the basis of the embodiment shown in FIG. 1, this embodiment is described in a implementation manner, and specifically includes the following steps.

S201. A mobile terminal receives measurement configuration information and indication information that are sent by an access network element corresponding to a serving cell.

The measurement configuration information and the indication information may be sent, to the mobile terminal by using same signaling, by the access network element corresponding to the serving cell, or may be sent, to the mobile terminal by using different signaling, by the access network element corresponding to the serving cell.

S202. The mobile terminal measures a target cell, so as to obtain a measurement result of the target cell.

The step is specifically described in S101. However, it should be noted that, in addition to being a newly discovered neighboring cell, the target cell may be a specified cell described in the S101, and may be specifically specified by the indication information. That is, if the indication information further carries a cell identity, a cell corresponding to the cell identity carried in the indication information is the target cell.

S203. The mobile terminal determines whether the measurement result of the target cell meets an entering condition of a measurement reporting event corresponding to the indication information, and if yes, the mobile terminal performs S204, or if no, this embodiment ends.

Optionally, in this embodiment, there is at least one piece of the indication information, and there is at least one measurement reporting event corresponding to the indication information.

For example, if the mobile terminal receives two pieces of indication information in S201, one of the two pieces of indication information is corresponding to an event A3, and the other is corresponding to an event A4. When the measurement result obtained in S202 meets an entering condition of either measurement reporting event of the event A3 or the event A4, that is, when the measurement result meets the entering condition of the measurement reporting event corresponding to the indication information, the mobile terminal performs the following S204.

Alternatively, if one piece of indication information is obtained in S201, and the indication information is corresponding to an event A3 and an event A4, when the measurement result obtained in S202 meets an entering condition of either the event A3 or the event A4, that is, when the measurement result meets the entering condition of the measurement reporting event corresponding to the indication information, the mobile terminal performs the following S204.

Alternatively, if the indication information obtained in S201 is corresponding to an event A3, when the measurement result obtained in S202 meets an entering condition of the event A3, the mobile terminal performs the following S204. That is, when Mn meets "Mn+Ofn+Ocn−Hys>Ms+Ofs+Ocs+Off", the mobile terminal performs S204. However, when Mn meets "Mn+Ofn+Ocn−Hys>Thresh" but does not meet "Mn+Ofn+Ocn−Hys>Ms+Ofs+Ocs+Off", this embodiment ends, that is, an entering condition that is of a measurement reporting event and is met by the measurement result is not the entering condition of the measurement reporting event corresponding to the indication information.

It should be additionally noted that, if the indication information is used to instruct the mobile terminal to initiate connection establishment to an access network element corresponding to the target cell if the measurement result meets the entering condition of the measurement reporting event corresponding to the indication information, the mobile terminal may directly perform S205 after determining, by performing S203, that the measurement result of the target cell meets the entering condition of the measurement reporting event corresponding to the indication information.

However, to ensure that a control effect, on the mobile terminal, of a network-side device in a communications network is not affected and to give consideration to mobility of the mobile terminal as well, in this embodiment, preferably, the indication information is used to instruct the mobile terminal to initiate connection establishment to the access network element corresponding to the target cell if the measurement result meets the entering condition of the measurement reporting event corresponding to the indication information and the mobile terminal generates a measurement report of the measurement reporting event corresponding to the indication information. The mobile terminal performs S204 and S205 in sequence after determining, by performing S203, that the measurement result meets the entering condition of the measurement reporting event corresponding to the indication information.

S204. The mobile terminal generates a measurement report of the measurement reporting event corresponding to the indication information.

S205. The mobile terminal initiates connection establishment to an access network element corresponding to the target cell.

The connection establishment in S205 specifically includes:

initiating, by the mobile terminal, a random access process to the target cell, and/or any one of the following processing:

initiating, by the mobile terminal to the target cell, an RRC connection re-establishment process, a cell update process, an RRC connection establishment process, or a forward handover process.

Figure 3:
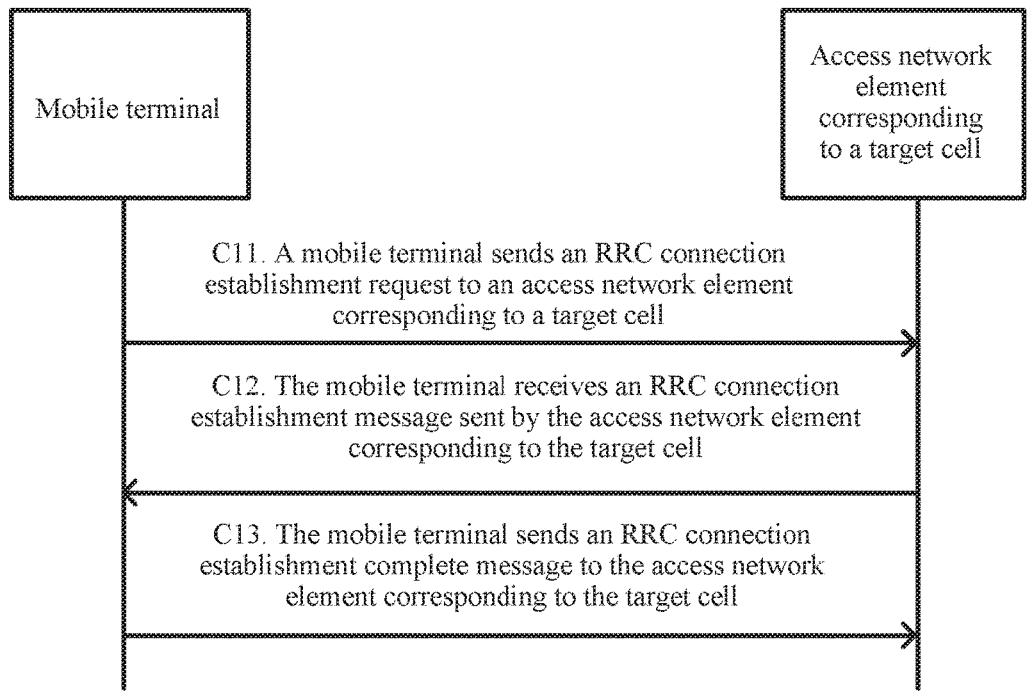
FIG. 3 is a schematic diagram of an RRC connection establishment process according to Embodiment 2 of the present invention.

FIG. 3 is a schematic diagram of an RRC connection establishment process according to Embodiment 2 of the present invention. As shown in FIG. 3, a specific process includes the following steps:

C11. The mobile terminal sends an RRC connection establishment request to the access network element corresponding to the target cell.

C12. The mobile terminal receives an RRC connection establishment message sent by the access network element corresponding to the target cell.

C13. The mobile terminal sends an RRC connection establishment complete message to the access network element corresponding to the target cell.

Figure 4:
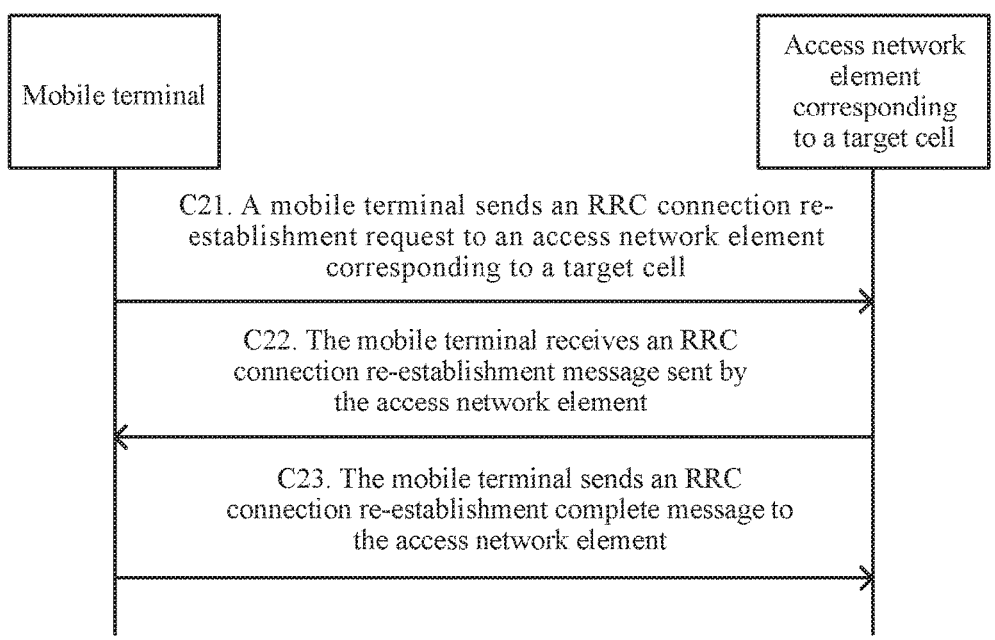
FIG. 4 is a schematic diagram of an RRC connection re-establishment process according to Embodiment 2 of the present invention.

FIG. 4 is a schematic diagram of an RRC connection re-establishment process according to Embodiment 2 of the present invention. As shown in FIG. 4, a specific process includes the following steps:

C21. The mobile terminal sends an RRC connection re-establishment request to the access network element corresponding to the target cell.

C22. The mobile terminal receives an RRC connection re-establishment message sent by the access network element corresponding to the target cell.

C23. The mobile terminal sends an RRC connection re-establishment complete message to the access network element corresponding to the target cell.

Figure 5:
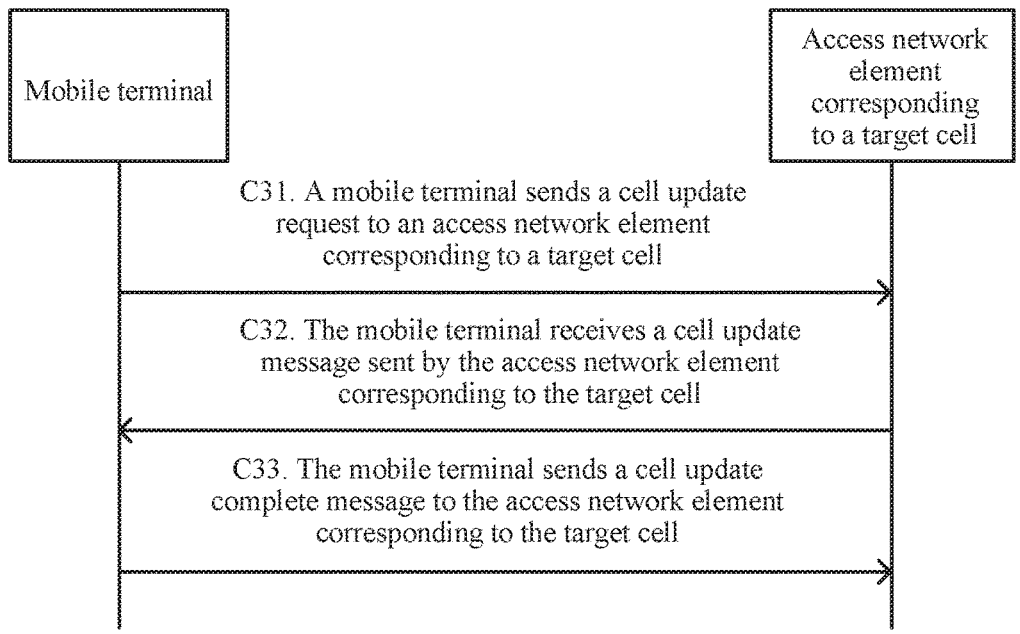
FIG. 5 is a schematic diagram of a cell update process according to Embodiment 2 of the present invention.

FIG. 5 is a schematic diagram of a cell update process according to Embodiment 2 of the present invention. As shown in FIG. 5, a specific process includes the following steps:

C31. The mobile terminal sends a cell update request to the access network element corresponding to the target cell.

C32. The mobile terminal receives a cell update message sent by the access network element corresponding to the target cell.

C33. The mobile terminal sends a cell update complete message to the access network element corresponding to the target cell.

The C33 is an optional step, and may be performed or may not be performed according to an actual network status.

Figure 6:
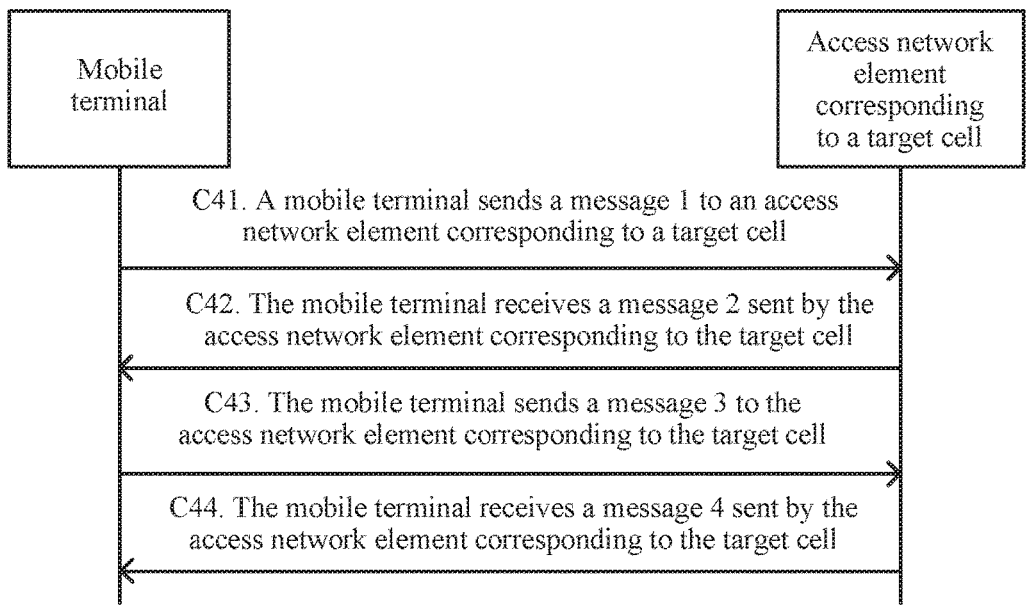
FIG. 6 is a schematic diagram of a contention-based random access process according to Embodiment 2 of the present invention.

FIG. 6 is a schematic diagram of a contention-based random access channel process according to Embodiment 2 of the present invention. As shown in FIG. 6, a specific process includes the following steps:

C41. The mobile terminal sends a message 1 to the access network element corresponding to the target cell. The message 1 is specifically a "Random Access Preamble".

C42. The mobile terminal receives a message 2 sent by the access network element corresponding to the target cell. The message 2 is specifically a "Random Access Response".

C43. The mobile terminal sends a message 3 to the access network element corresponding to the target cell. The message 3 is specifically "Scheduled Transmission".

C44. The mobile terminal receives a message 4 sent by the access network element corresponding to the target cell. The message 4 is specifically "Contention Resolution".

Figure 7:
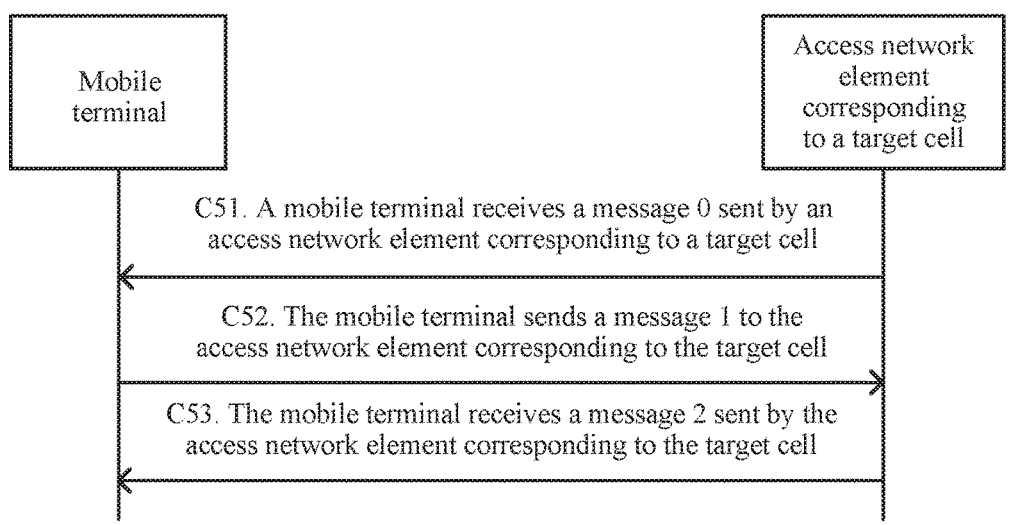
FIG. 7 is a schematic diagram of a non-contention-based random access channel process according to Embodiment 2 of the present invention.

FIG. 7 is a schematic diagram of a non-contention-based random access channel process according to Embodiment 2 of the present invention. As shown in FIG. 7, a specific process includes the following steps:

C51. The mobile terminal receives a message 0 sent by the access network element corresponding to the target cell. The message 0 is specifically "RA Preamble assignment".

C52. The mobile terminal sends a message 1 to the access network element corresponding to the target cell. The message 1 is specifically a "Random Access Preamble".

C53. The mobile terminal receives a message 2 sent by the access network element corresponding to the target cell. The message 2 is specifically a "Random Access Response".

It should be additionally noted that, when it is determined, by performing S203, that this embodiment ends, it indicates that the mobile terminal does not continue to perform S204 and S205, but continues to perform other operations according to the prior art. For example, if the measurement reporting event corresponding to the indication information is the event A3, but the mobile terminal determines in S203 that the measurement result of the target cell does not meet the entering condition of the event A3 but meets the entering condition of the event A4, the mobile terminal generates a measurement report of the event A4 according to the measurement result that meets the entering condition of the event A4; sends the measurement report of the event A4 to the access network element corresponding to the serving cell; and waits for the access network element corresponding to the serving cell to deliver, to the mobile terminal, an indication that connection establishment is allowed. The mobile terminal establishes a connection to the target cell only when the mobile terminal receives the indication that connection establishment is allowed and that is delivered, to the mobile terminal, by the access network element corresponding to the serving cell.

That is, in the prior art, when the measurement result of the target cell meets an entering condition of a measurement reporting event, first, the mobile terminal needs to generate a measurement report and report the measurement report to the access network element corresponding to the serving cell, and then, needs to wait for the access network element corresponding to the serving cell to deliver the indication that connection establishment is allowed. In this process, the mobile terminal needs to spend a relatively long time period, and this is unfavorable to improving efficiency of establishing a connection to the access network element corresponding to the target cell by the mobile terminal. However, in this specification, provided that the measurement result of the target cell meets the entering condition of the measurement reporting event corresponding to the indication information, and the mobile terminal generates the measurement report of the measurement reporting event corresponding to the indication information, the mobile terminal can establish a connection between the mobile terminal and the target cell, so that efficiency of establishing a connection to the access network element corresponding to the target cell by the mobile terminal is improved, and mobility of the mobile terminal is improved.

In this embodiment, indication information is used to instruct a mobile terminal to initiate connection establishment to an access network element corresponding to a target cell if a measurement result meets an entering condition of a measurement reporting event corresponding to the indication information and the mobile terminal generates a measurement report of the measurement reporting event corresponding to the indication information. Therefore, when initiating connection establishment to the access network element corresponding to the target cell, the mobile terminal can skip sending, to an access network element corresponding to a serving cell, the measurement report of the measurement reporting event corresponding to the indication information, and directly initiate connection establishment to the access network element corresponding to the target cell, so that the mobile terminal can initiate, in a timely manner, connection establishment to the access network element corresponding to the target cell, and mobility of the mobile terminal is improved.

Figure 8:
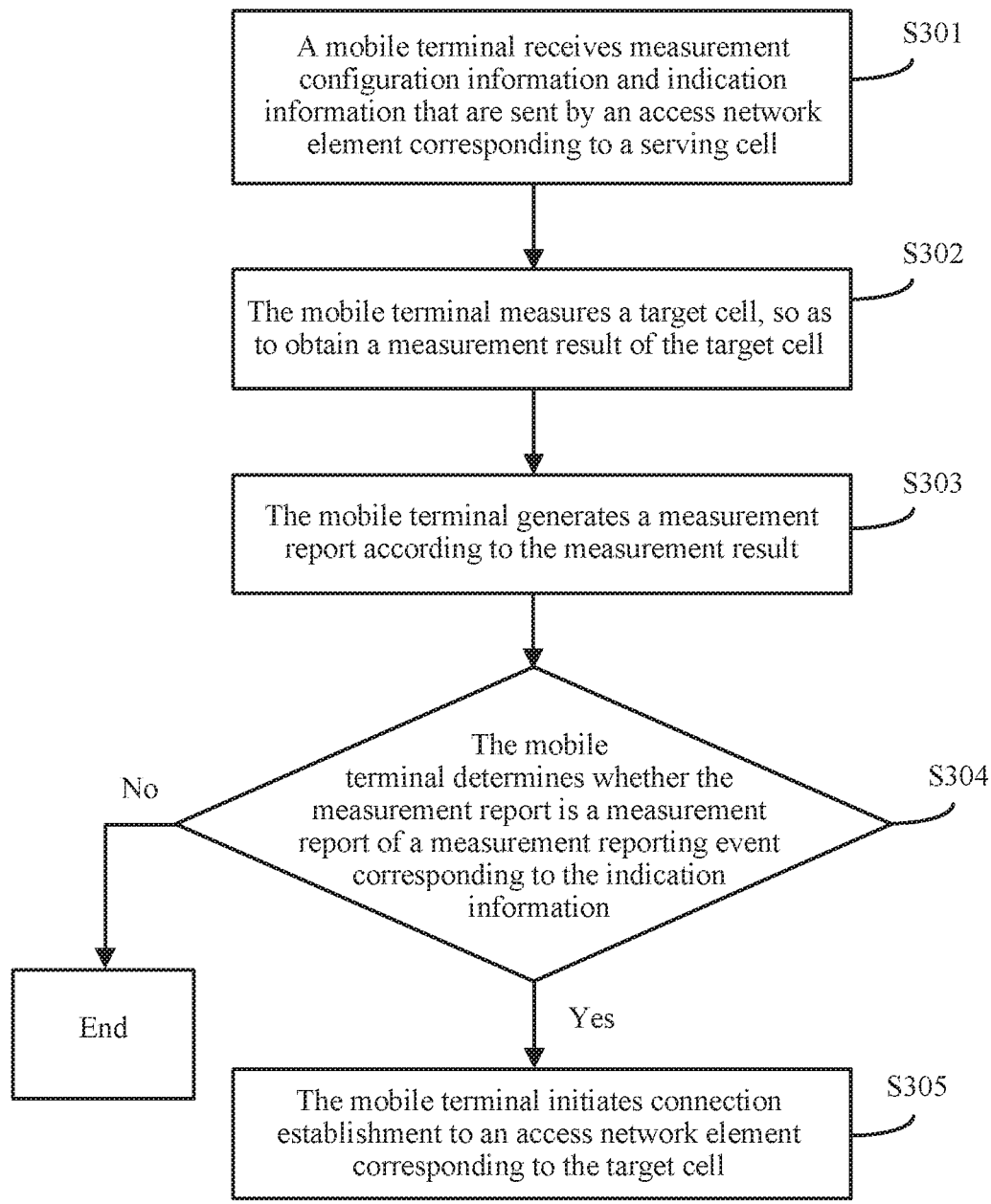
FIG. 8 is a schematic flowchart of Embodiment 3 of a processing method for establishing a connection to an access network element by a mobile terminal according to the present invention.

FIG. 8 is a schematic flowchart of Embodiment 3 of a processing method for establishing a connection to an access network element by a mobile terminal according to the present invention. As shown in FIG. 8, on the basis of the embodiment shown in FIG. 1, this embodiment is described in a preferred implementation manner, and specifically includes the following steps.

S301. A mobile terminal receives measurement configuration information and indication information that are sent by an access network element corresponding to a serving cell.

The measurement configuration information and the indication information may be sent, to the mobile terminal by using same signaling, by the access network element corresponding to the serving cell, or may be sent, to the mobile terminal by using different signaling, by the access network element corresponding to the serving cell.

S302. The mobile terminal measures a target cell, so as to obtain a measurement result of the target cell.

The step is specifically described in S101. However, it should be noted that, in addition to being a newly discovered neighboring cell, the target cell may be a specified cell described in the S101, and may be specifically specified by the indication information. That is, if the indication information further carries a cell identity, a cell corresponding to the cell identity carried in the indication information is the target cell.

S303. The mobile terminal generates a measurement report according to the measurement result.

S304. The mobile terminal determines whether the measurement report is a measurement report of a measurement reporting event corresponding to the indication information, and if yes, the mobile terminal performs S305, or if no, this embodiment ends.

In this embodiment, the indication information is used to instruct the mobile terminal to initiate connection establishment to an access network element corresponding to the target cell if the mobile terminal generates the measurement report of the measurement reporting event corresponding to the indication information. Provided that the measurement result obtained in S302 meets an entering condition of a measurement reporting event, a measurement report is generated in S303. It may be understood that, when an entering condition that is of a measurement reporting event and is met by the measurement result in S302 is not the entering condition of the measurement reporting event corresponding to the indication information, the measurement report generated in S303 is not the measurement report of the measurement reporting event corresponding to the indication information either.

However, if the mobile terminal determines, by performing S304, that the measurement report in S303 is the measurement report of the measurement reporting event corresponding to the indication information, that is, when the mobile terminal determines that the mobile terminal generates the measurement report of the measurement reporting event corresponding to the indication information, according to the indication information, the mobile terminal may skip sending, to the access network element corresponding to the serving cell, the measurement report of the measurement reporting event corresponding to the indication information, and directly perform S305.

Optionally, in this embodiment, there is at least one piece of the indication information, and there is at least one measurement reporting event corresponding to the indication information.

For example, if the mobile terminal receives two pieces of indication information in S301, one of the two pieces of indication information is corresponding to an event A3, and the other is corresponding to an event A4, when the measurement result obtained in S302 meets an entering condition of either measurement reporting event of the event A3 or the event A4, the measurement report generated in S303 is necessarily the measurement report of the measurement reporting event corresponding to the indication information. When determining, by performing S304, that the mobile terminal generates the measurement report of the measurement reporting event corresponding to the indication information, the mobile terminal directly performs the following S305.

Alternatively, if one piece of indication information is obtained in S301, and the indication information is corresponding to an event A3 and an event A4, when the measurement result obtained in S302 meets an entering condition of either the event A3 or the event A4, the measurement report generated in S303 is necessarily the measurement report corresponding to the indication information. When determining, by performing S304, that the mobile terminal generates the measurement report of the measurement reporting event corresponding to the indication information, the mobile terminal directly performs the following S305.

Alternatively, if the indication information obtained in S301 is corresponding to an event A3, when the measurement result obtained in S302 meets an entering condition of the event A3, the measurement report generated in S303 is necessarily the measurement report corresponding to the indication information. When determining, by performing S304, that the mobile terminal generates the measurement report of the measurement reporting event corresponding to the indication information, the mobile terminal directly performs the following S305. However, possibly, if the indication information obtained in S301 is corresponding to the event A3, but the measurement result obtained in S302 meets an entering condition of an event A4, the measurement report generated in S303 is not the measurement report corresponding to the indication information but a measurement report of the event A4. When the mobile terminal determines, by performing S304, that the mobile terminal does not generate the measurement report of the measurement reporting event corresponding to the indication information, this embodiment ends. That is, when Mn meets "Mn+Ofn+Ocn−Hys>Thresh" but not meets "Mn+Ofn+Ocn−Hys>Ms+Ofs+Ocs+Off", the measurement report generated in S303 is not the measurement report corresponding to the indication information. When the mobile terminal determines, by performing S304, that the mobile terminal does not generate the measurement report of the measurement reporting event corresponding to the indication information, this embodiment ends.

S305. The mobile terminal initiates connection establishment to an access network element corresponding to the target cell.

The mobile terminal initiates a random access process to the target cell, and/or any one of the following processing:
  initiating, by the mobile terminal to the target cell, an RRC connection re-establishment process, a cell update process, an RRC connection establishment process, or a forward handover process. For details, reference may be made to signaling processes shown in the FIG. 3 to FIG. 7.

In this embodiment, indication information is used to instruct a mobile terminal to skip, if the mobile terminal generates a measurement report of a measurement reporting event corresponding to the indication information, sending, to an access network element corresponding to a serving cell, the measurement report of the measurement reporting event corresponding to the indication information. Therefore, the mobile terminal can directly initiate connection establishment to an access network element corresponding to a target cell, so that mobility of the mobile terminal is improved.

Figure 9A:
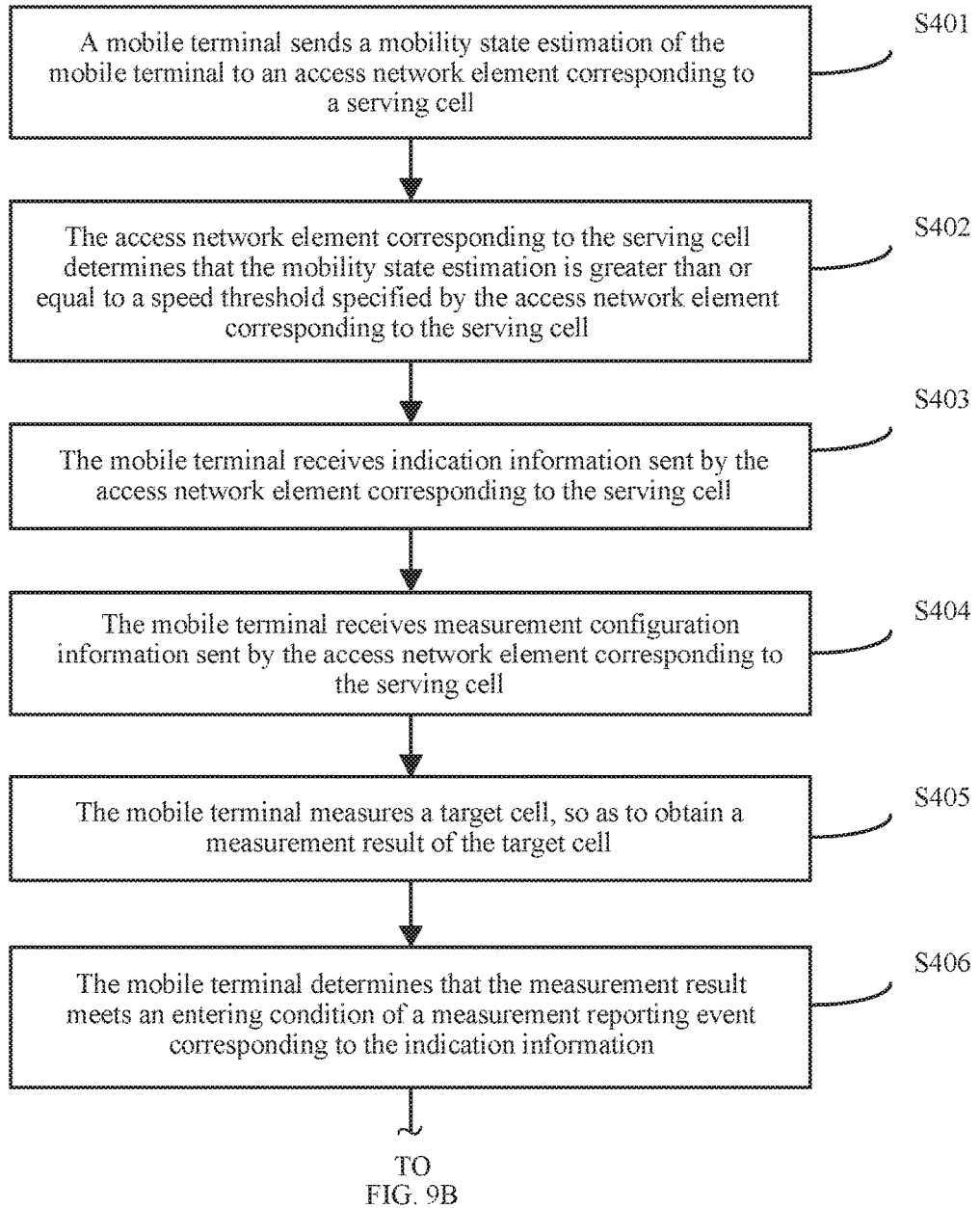
FIG. 9A and FIG. 9B are a schematic flowchart of Embodiment 4 of a processing method for establishing a connection to an access network element by a mobile terminal according to the present invention.
Figure 9B:
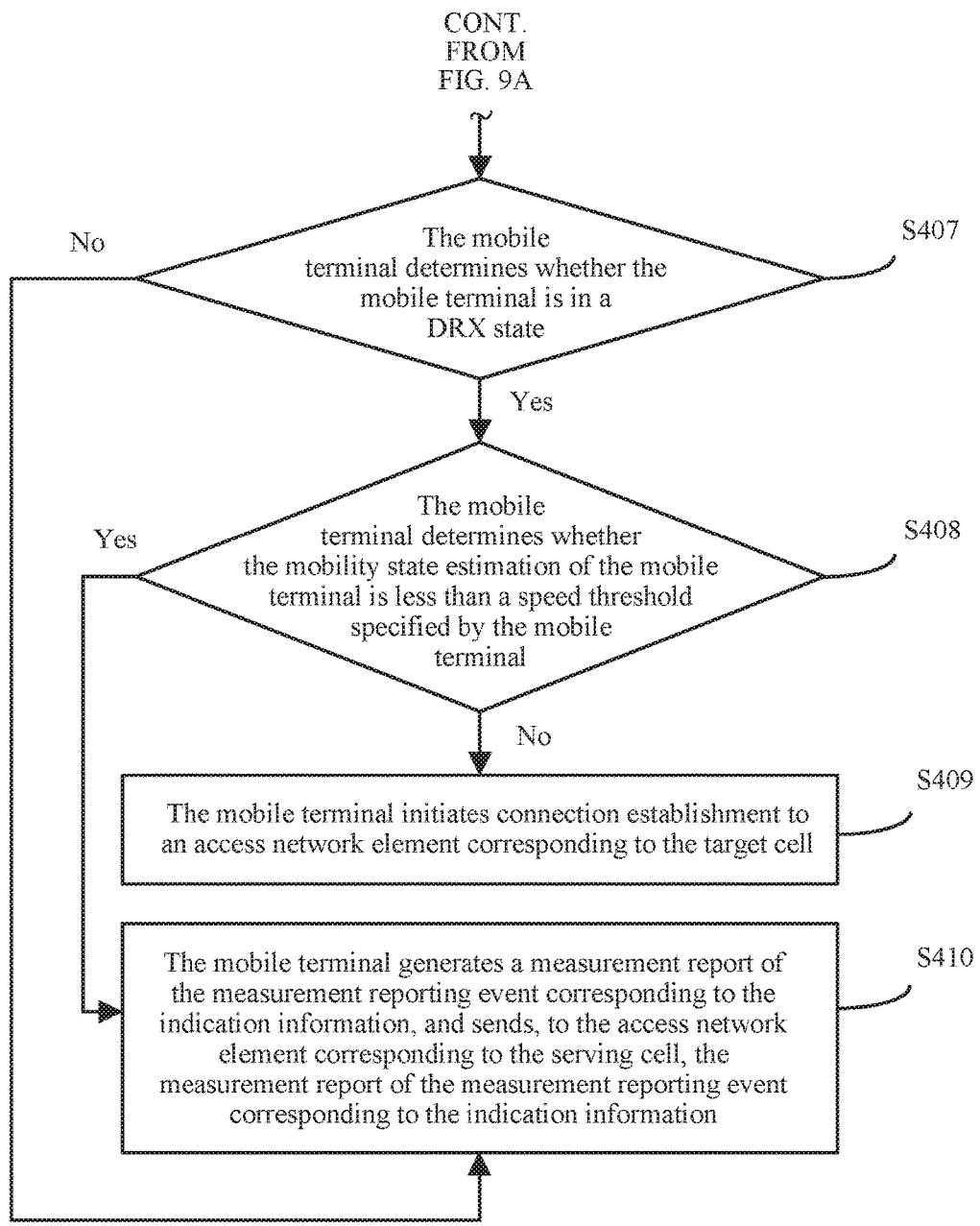

FIG. 9A and FIG. 9B are a schematic flowchart of Embodiment 4 of a processing method for establishing a connection to an access network element by a mobile terminal according to the present invention. As shown in FIG. 9A and FIG. 9B, on the basis of the embodiment shown in FIG. 1, this embodiment gives a further description, and specifically includes the following steps.

S401. A mobile terminal sends a mobility state estimation of the mobile terminal to an access network element corresponding to a serving cell.

The mobility state estimation (MSE) is a mobility status of the mobile terminal obtained by the mobile terminal at a current moment. For example, when the mobile terminal moves along with a vehicle on which a user is located, the mobile terminal may learn whether the mobile terminal is in a high-mobility state. When the mobile terminal is in a high-mobility state, to ensure mobility of the mobile terminal, the mobile terminal needs to send the mobility state estimation of the mobile terminal to the access network element corresponding to the serving cell.

S402. The access network element corresponding to the serving cell determines that the mobility state estimation is greater than or equal to a speed threshold specified by the access network element corresponding to the serving cell.

S403. The mobile terminal receives indication information sent by the access network element corresponding to the serving cell.

The indication information is used to instruct the mobile terminal to initiate connection establishment to an access network element corresponding to a target cell if a measurement result meets an entering condition of a measurement reporting event corresponding to the indication information.

S404. The mobile terminal receives measurement configuration information sent by the access network element corresponding to the serving cell.

When the access network element corresponding to the serving cell learns, by performing S402, that the mobile terminal currently moves at high speed, if a prior-art method for establishing, by the mobile terminal, a connection to the access network element corresponding to the target cell is still used, mobility of the mobile terminal is affected. Therefore, to ensure mobility of the mobile terminal, the access network element corresponding to the serving cell performs S403 to deliver the indication information to the mobile terminal.

The measurement configuration information and the indication information may be simultaneously delivered, that is, the S403 and S404 are implemented by using same signaling. Optionally, S404 may be performed before S403, or may be performed before or at the same time as S402, or may be performed before or at the same time as S401. For example, first, the mobile terminal receives the measurement configuration information, and then, when determining that the mobile terminal moves at high speed, the access network element corresponding to the serving cell delivers the indication information. In addition, optionally, both the S401 and S402 are not performed, that is, that the access network element delivers the indication information to the mobile terminal is not subject to a movement speed of the mobile terminal.

S405. The mobile terminal measures a target cell, so as to obtain a measurement result of the target cell.

Before the mobile terminal receives the indication information, the mobile terminal discovers the target cell according to S-Measure. That is, the mobile terminal performs RRM measurement on a neighboring cell only when the mobile terminal learns that service of quality of the serving cell is lower than a preset value, so as to discover the target cell whose measurement result meets the measurement reporting event. However, in this embodiment, after the mobile terminal receives the indication information, the mobile terminal may ignore the S-Measure, that is, the mobile terminal may perform RRM measurement on a neighboring cell at any time without a need to wait until the service of quality of the serving cell is lower than the preset value, so as to determine, in a timely manner, whether the measurement result of the target cell meets the entering condition of the measurement reporting event, so that mobility of the mobile terminal is further improved.

S406. The mobile terminal determines that the measurement result meets an entering condition of a measurement reporting event corresponding to the indication information.

It may be understood that, if the mobile terminal establishes a connection to the target cell provided that the mobile terminal determines, at any moment, that the measurement result of the target cell meets the entering condition of the measurement reporting event corresponding to the indication information, control of a network-side device (such as a base station or a base station controller) on the mobile terminal is weakened. However, there is relatively great impact on mobility when the mobile terminal is in a short-cycle DRX state or a long-cycle DRX state. Therefore, optionally, when the mobile terminal in this embodiment is in a short-cycle DRX state or a long-cycle DRX state, the mobile terminal establishes a connection to the target cell according to an indication of the indication information, that is, the mobile terminal further needs to perform the following S407 after performing S406.

S407. The mobile terminal determines whether the mobile terminal is in a DRX state, and if yes, performs S409 or S408, or if no, performs S410.

The DRX state is a short-cycle DRX state or a long-cycle DRX state.

In the prior art, duration in which the mobile terminal is in a sleep state also affects mobility of the mobile terminal. In addition, when the mobile terminal is in a short-cycle DRX state or a long-cycle DRX state, duration in which the mobile terminal is in a sleep state is relatively long, and there is more severe impact on mobility of the mobile terminal. However, in this embodiment, when the mobile terminal is in a short-cycle DRX state or a long-cycle DRX state, the mobile terminal establishes a connection to the target cell in a timely manner according to the indication of the indication information, and mobility of the mobile terminal is not affected by a short-cycle DRX state or a long-cycle DRX state of the mobile terminal.

S408. The mobile terminal determines whether the mobility state estimation of the mobile terminal is less than a speed threshold specified by the mobile terminal, and if no, performs S409, or if yes, performs S410.

When the mobile terminal is located in a critical area of the serving cell and the target cell, if the mobile terminal moves at lower speed, "ping-pong handover" between the target cell and the serving cell more likely occurs in the mobile terminal. To avoid a situation in which ping-pong handover occurs, preferably, S408 needs to be performed. That is, when the mobile terminal determines that the mobility state estimation of the mobile terminal is greater than or equal to the speed threshold specified by the mobile terminal, the mobile terminal applies the indication information, that is, performs the following S409.

In addition, the speed threshold specified by the mobile terminal and the speed threshold specified by the access network element corresponding to the serving cell may be the same or may be different. In addition, the speed threshold specified by the mobile terminal may be configured, for the mobile terminal, by the access network element corresponding to the serving cell, or is specified in a communication protocol, for example, the speed threshold of the mobile terminal is a speed of a high-mobility state.

Further, the S407 and S408 are optional steps, that is, when this embodiment is implemented in an actual application, the mobile terminal may choose to perform S407 and/or S408 after performing S406, and a sequence of performing S407 and S408 is not limited. In this embodiment, an example in which S408 is performed after S407 of determining that the mobile terminal is in a DRX state is performed is used.

S409. The mobile terminal initiates connection establishment to an access network element corresponding to the target cell.

In this embodiment, the indication information is used to instruct the mobile terminal to initiate connection establishment to the access network element corresponding to the target cell if the measurement result meets the entering condition of the measurement reporting event corresponding to the indication information. Therefore, when the mobile terminal determines, according to the measurement result and the indication information, that the measurement result meets the entering condition of the measurement reporting event corresponding to the indication information, the mobile terminal initiates connection establishment to the access network element corresponding to the target cell. That is, after determining that the measurement result of the target cell meets the entering condition of the measurement reporting event corresponding to the indication information, the mobile terminal may skip generating a measurement report of the measurement reporting event corresponding to the indication information, skip sending, to the access network element corresponding to the serving cell, the measurement report of the measurement reporting event corresponding to the indication information, and initiate connection establishment to the access network element corresponding to the target cell, so that the mobile terminal can initiate, in a timely manner, connection establishment to the access network element corresponding to the target cell, and mobility of the mobile terminal is improved.

S410. The mobile terminal generates a measurement report of the measurement reporting event corresponding to the indication information, and sends, to the access network element corresponding to the serving cell, the measurement report of the measurement reporting event corresponding to the indication information.

In this embodiment, even if the mobile terminal receives the indication information and the measurement result of the target cell meets the entering condition of the measurement reporting event corresponding to the indication information, the mobile terminal may choose, according to a determining result in S407 and/or S408, to apply the indication information (that is, perform S409). Alternatively, the mobile terminal chooses, according to a determining result in S407 and/or S408, not to apply the indication information; still establishes, according to the prior art, a connection to the access network element corresponding to the target cell, that is, performs S410; then, waits for the access network element corresponding to the serving cell to deliver, to the mobile terminal, an indication that connection establishment is allowed. The mobile terminal establishes a connection to the access network element corresponding to the target cell only when the mobile terminal receives the indication that connection establishment is allowed and that is delivered by the access network element to the mobile terminal.

In this embodiment, after determining, according to a measurement result of a target cell, that the measurement result meets an entering condition of a measurement reporting event corresponding to indication information, according to an indication of the indication information, a mobile terminal may skip generating a measurement report of the measurement reporting event corresponding to the indication information, and skip sending, to an access network element corresponding to a serving cell, the measurement report of the measurement reporting event corresponding to the indication information, so that the mobile terminal can directly initiate connection establishment to an access network element corresponding to the target cell, and mobility of the mobile terminal is improved.

Figure 10A:
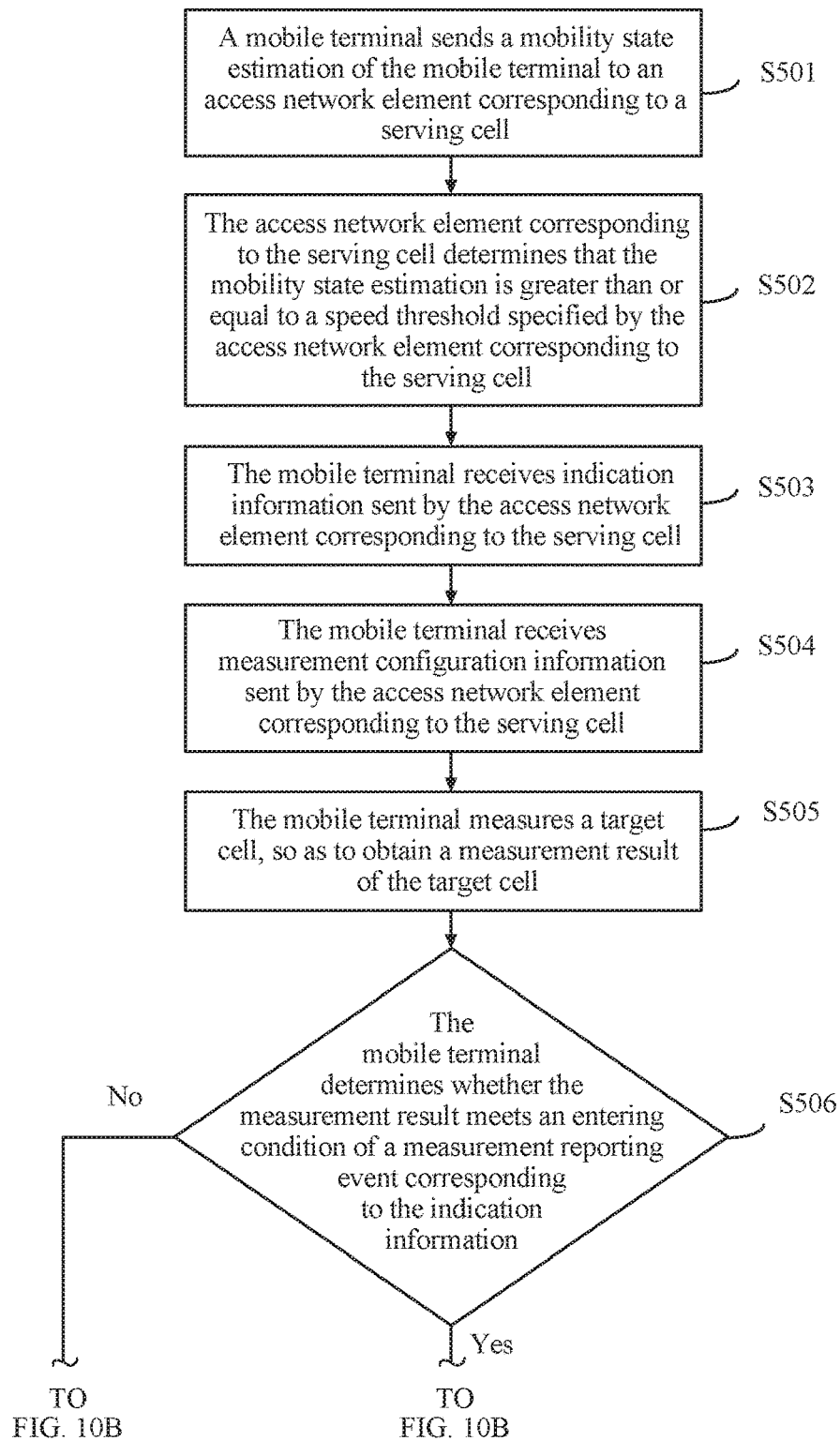
FIG. 10A and FIG. 10B are a schematic flowchart of Embodiment 5 of a processing method for establishing a connection to a cell by a mobile terminal according to the present invention.
Figure 10B:
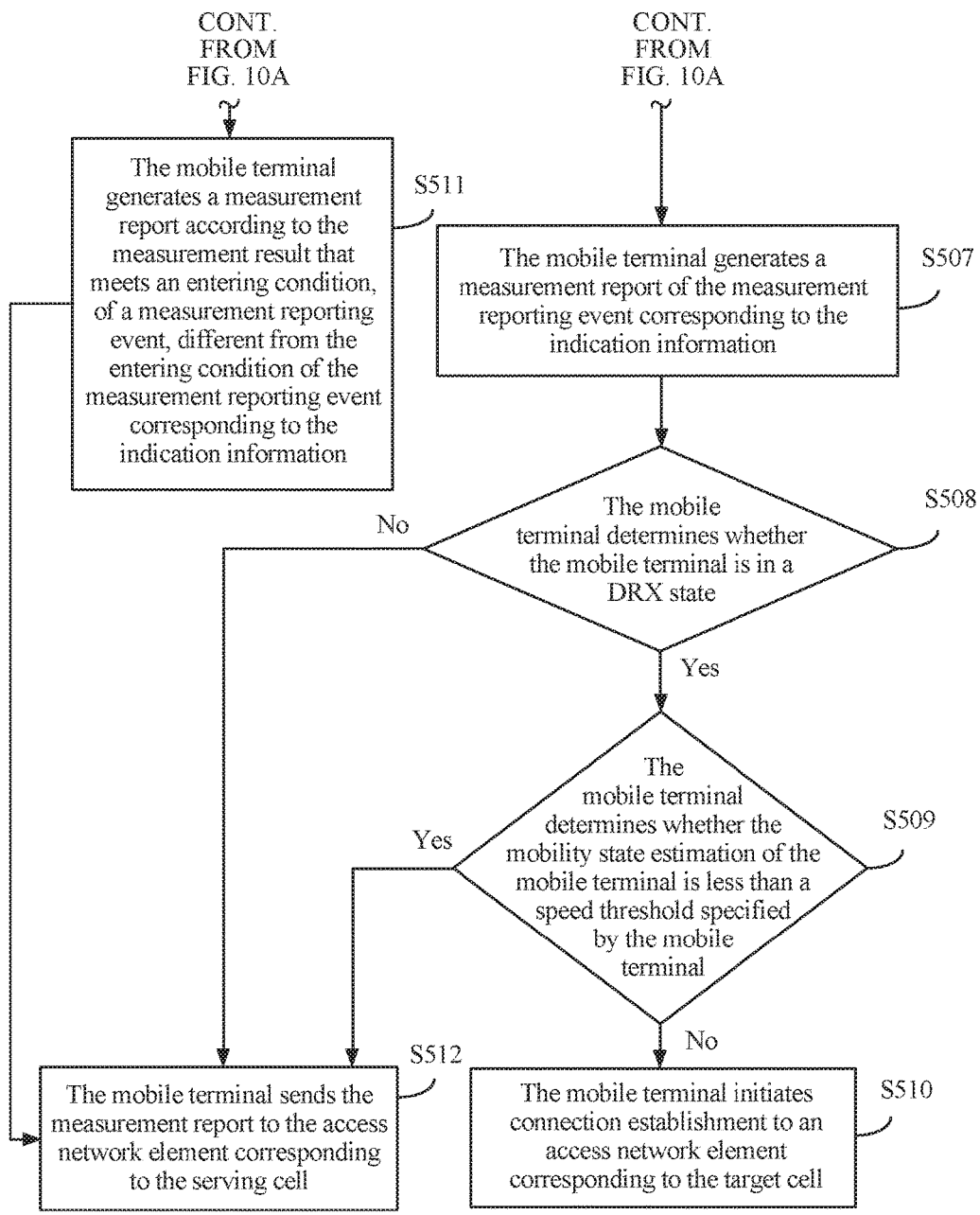

FIG. 10A and FIG. 10B are a schematic flowchart of Embodiment 5 of a processing method for establishing a connection to a cell by a mobile terminal according to the present invention. As shown in FIG. 10A and FIG. 10B, on the basis of the embodiment shown in FIG. 1 or FIG. 2, in a preferred implementation manner, this embodiment specifically includes the following steps.

S501. A mobile terminal sends a mobility state estimation of the mobile terminal to an access network element corresponding to a serving cell.

The mobility state estimation is a mobility status of the mobile terminal obtained by the mobile terminal at a current moment. For example, when the mobile terminal moves along with a vehicle on which a user is located, the mobile terminal may learn whether the mobile terminal is in a high-mobility state. When the mobile terminal is in a high-mobility state, to ensure mobility of the mobile terminal, the mobile terminal needs to send the mobility state estimation of the mobile terminal to the access network element corresponding to the serving cell.

S502. The access network element corresponding to the serving cell determines that the mobility state estimation is greater than or equal to a speed threshold specified by the access network element corresponding to the serving cell.

S503. The mobile terminal receives indication information sent by the access network element corresponding to the serving cell.

The indication information is used to instruct the mobile terminal to initiate connection establishment to an access network element corresponding to a target cell if a measurement result meets an entering condition of a measurement reporting event corresponding to the indication information and the mobile terminal generates a measurement report of the measurement reporting event corresponding to the indication information.

S504. The mobile terminal receives measurement configuration information sent by the access network element corresponding to the serving cell.

When the access network element corresponding to the serving cell learns, by performing S502, that the mobile terminal currently moves at high speed, if a prior-art method for establishing, by the mobile terminal, a connection to the access network element corresponding to the target cell is still used, mobility of the mobile terminal is affected. Therefore, to ensure mobility of the mobile terminal, the access network element corresponding to the serving cell performs S503 to deliver the indication information to the mobile terminal.

The measurement configuration information and the indication information may be simultaneously delivered, that is, the S503 and S504 are implemented by using same signaling. Optionally, S504 may be performed before S503, or may be performed before or at the same time as S502, or may be performed before or at the same time as S501. For example, first, the mobile terminal receives the measurement configuration information, and then, when determining that the mobile terminal moves at the high speed, the access network element delivers the indication information. In addition, optionally, both the S501 and S502 are not performed, that is, that the access network element delivers the indication information to the mobile terminal is not subject to a movement speed of the mobile terminal.

S505. The mobile terminal measures a target cell, so as to obtain a measurement result of the target cell.

S506. The mobile terminal determines whether the measurement result meets an entering condition of a measurement reporting event corresponding to the indication information, and if yes, performs S507, or if no, performs S511.

In this embodiment, the indication information is used to instruct the mobile terminal to initiate connection establishment to the access network element corresponding to the target cell if the measurement result meets the entering condition of the measurement reporting event corresponding to the indication information and the mobile terminal generates the measurement report of the measurement reporting event corresponding to the indication information. Therefore, the mobile terminal in this embodiment determines, by performing S506, that the measurement result meets the entering condition of the measurement reporting event corresponding to the indication information.

Possibly, if the measurement result meets neither the entering condition of the measurement reporting event corresponding to the indication information nor an entering condition, of a measurement reporting event, different from the entering condition of the measurement reporting event corresponding to the indication information, this embodiment ends, that is, the mobile terminal no longer performs the following steps.

However, if the measurement result does not meet the entering condition of the measurement reporting event corresponding to the indication information but meets an entering condition, of a measurement reporting event, different from the entering condition of the measurement reporting event corresponding to the indication information, in this embodiment, according to the prior art, S511 is performed and S512 is subsequently performed. FIG. 9 uses an example in which the measurement result does not meet the entering condition of the measurement reporting event corresponding to the indication information but meets an entering condition, of a measurement reporting event, different from the entering condition of the measurement reporting event corresponding to the indication information.

S507. The mobile terminal generates a measurement report of the measurement reporting event corresponding to the indication information.

S508. The mobile terminal determines whether the mobile terminal is in a DRX state, and if yes, performs S510 or S509, or if no, performs S512.

The DRX state is a short-cycle DRX state or a long-cycle DRX state.

S509. The mobile terminal determines whether the mobility state estimation of the mobile terminal is less than a speed threshold specified by the mobile terminal, and if no, performs S510, or if yes, performs S512.

That is, when the mobile terminal determines that the mobility state estimation of the mobile terminal is greater than or equal to the speed threshold specified by the mobile terminal, the mobile terminal applies the indication information, that is, performs the following S510.

S508 and S509 are optional steps, that is, when this embodiment is implemented in an actual application, the mobile terminal may choose to perform S508 and/or S509 after performing S507, and a sequence of performing S508 and S509 is not limited. In this embodiment, an example in which the mobile terminal continues to perform S509 after performing S508 of determining that the mobile terminal is in a DRX state is used.

S510. The mobile terminal initiates connection establishment to an access network element corresponding to the target cell.

Optionally, after the mobile terminal initiates connection establishment to the access network element corresponding to the target cell, the mobile terminal remains connected to the access network element corresponding to the serving cell.

S511. The mobile terminal generates a measurement report according to the measurement result that meets an entering condition, of a measurement reporting event, different from the entering condition of the measurement reporting event corresponding to the indication information.

S512. The mobile terminal sends the measurement report to the access network element corresponding to the serving cell.

If a step before S512 is S508 or S509, the measurement report sent by the mobile terminal is the measurement report of the measurement reporting event corresponding to the indication information. If a step before S512 is S511, the measurement report sent by the mobile terminal is the measurement report generated by the mobile terminal according to the measurement result that meets an entering condition, of a measurement reporting event, different from the entering condition of the measurement reporting event corresponding to the indication information.

When a step before S512 is S508 or S509, it indicates that even if the mobile terminal receives the indication information, the measurement result of the target cell meets the entering condition of the measurement reporting event corresponding to the indication information, and the mobile terminal generates the measurement report of the measurement reporting event corresponding to the indication information, the mobile terminal chooses, according to a determining result in S508 and/or S509, to apply the indication information (that is, performs S510). Alternatively, the mobile terminal chooses, according to a determining result in S508 and/or S509, not to apply the indication information; still establishes a connection to the target cell according to the prior art, that is, performs S512 to send the measurement report to the access network element corresponding to the serving cell; then, waits for the access network element to deliver, to the mobile terminal, an indication that connection establishment is allowed. The mobile terminal establishes a connection to the access network element corresponding to the target cell only when the mobile terminal receives the indication that connection establishment is allowed and that is delivered by the access network element to the mobile terminal.

It may be understood that, a communication procedure in the prior art already includes a protocol, a configuration, or the like about measurement report generation. Therefore, when this embodiment is applied based on the existing protocol or configuration, relatively less content and a relatively small range need to be adjusted and modified, and this facilitates implementation of this embodiment.

In this embodiment, after determining that a measurement result of a target cell meets an entering condition of a measurement reporting event corresponding to indication information, a mobile terminal generates a measurement report of the measurement reporting event corresponding to the indication information, and then, the mobile terminal may directly initiate connection establishment to an access network element corresponding to the target cell. However, in the prior art, after the measurement result of the target cell meets an entering condition of a measurement reporting event, the mobile terminal generates a measurement report of the measurement reporting event, and then, sends the measurement report to an access network element corresponding to a serving cell, so as to wait for the access network element to deliver an indication that connection establishment is allowed. It can be learned, by comparing the prior art with this embodiment, that in this embodiment, provided that the measurement result of the target cell meets the entering condition of the measurement reporting event corresponding to the indication information and the mobile terminal generates the measurement report of the measurement reporting event corresponding to the indication information, the mobile terminal can establish a connection between the mobile terminal and the target cell in a timely manner, so that cell handover efficiency is improved and mobility of the mobile terminal is improved.

Figure 11A:
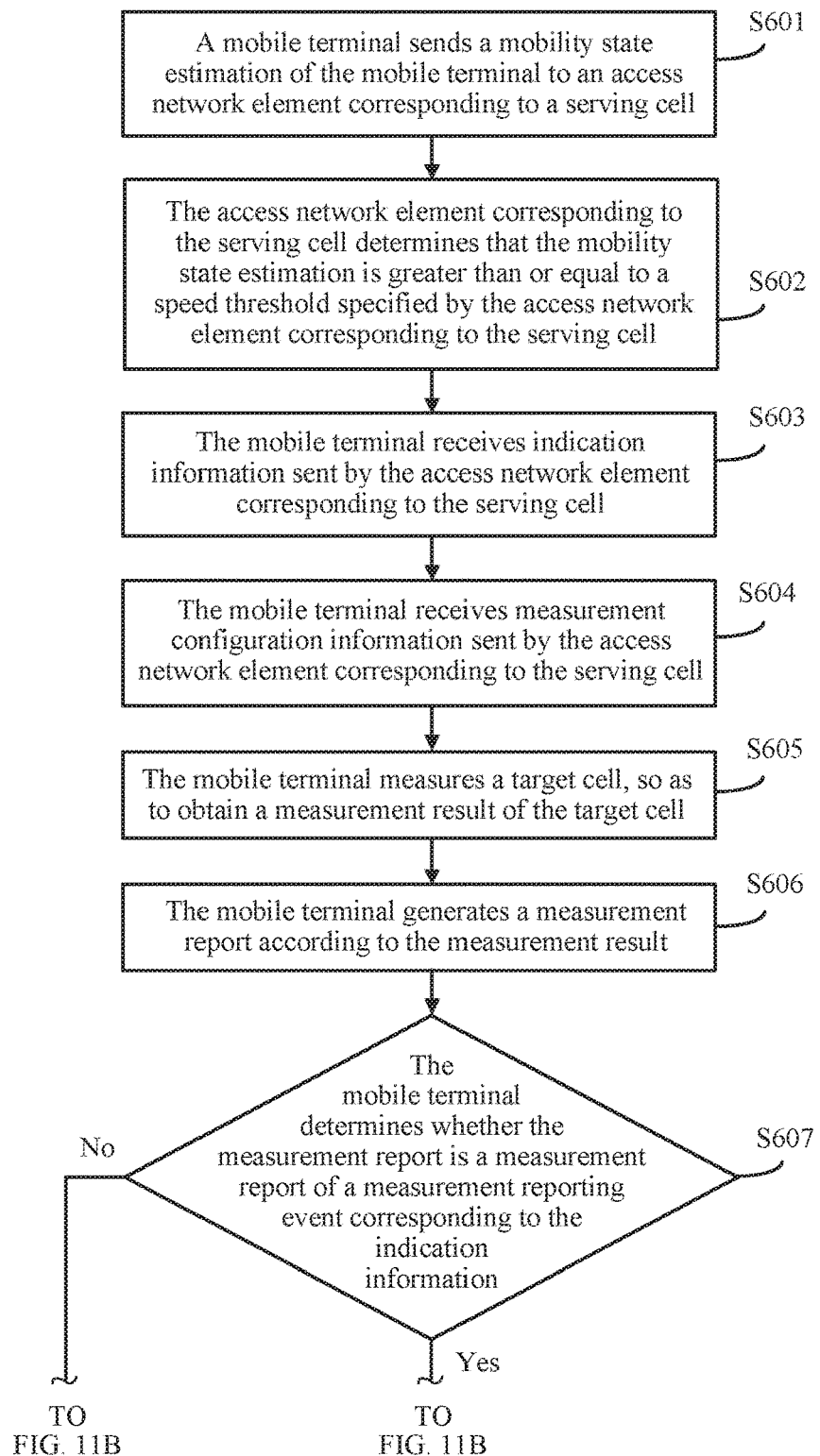
FIG. 11A and FIG. 11B are a schematic flowchart of Embodiment 6 of a processing method for establishing a connection to a cell by a mobile terminal according to the present invention.
Figure 11B:
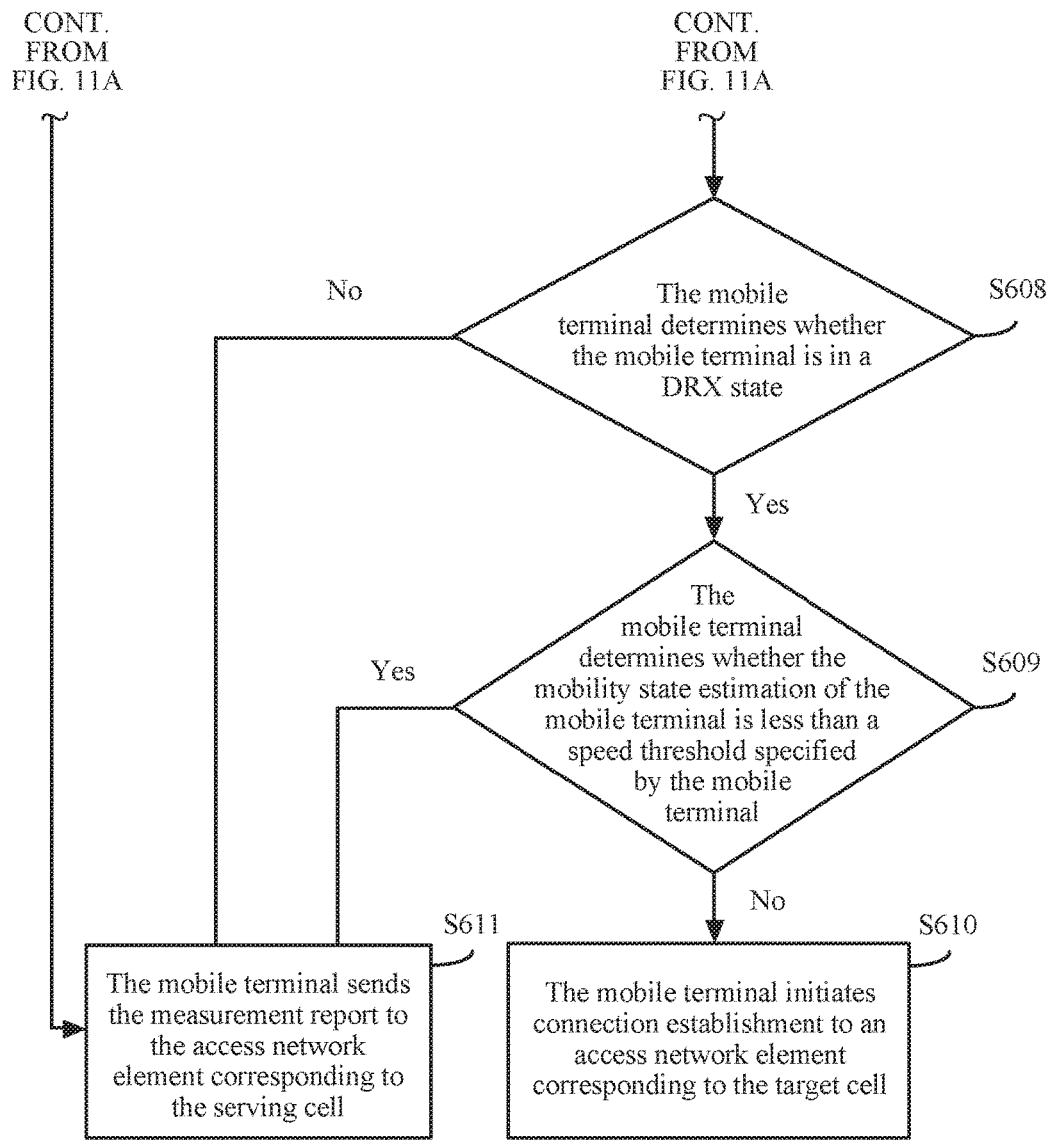

FIG. 11A and FIG. 11B are a schematic flowchart of Embodiment 6 of a processing method for establishing a connection to a cell by a mobile terminal according to the present invention. As shown in FIG. 11A and FIG. 11B, on the basis of the embodiment shown in FIG. 1 or FIG. 3, in a preferred implementation manner, this embodiment specifically includes the following steps.

S601. A mobile terminal sends a mobility state estimation of the mobile terminal to an access network element corresponding to a serving cell.

The mobility state estimation is a mobility status of the mobile terminal obtained by the mobile terminal at a current moment. For example, when the mobile terminal moves along with a vehicle on which a user is located, the mobile terminal may learn whether the mobile terminal is in a high-mobility state. When the mobile terminal is in a high-mobility state, to ensure mobility of the mobile terminal, the mobile terminal needs to send the mobility state estimation of the mobile terminal to the access network element corresponding to the serving cell.

S602. The access network element corresponding to the serving cell determines that the mobility state estimation is greater than or equal to a speed threshold specified by the access network element corresponding to the serving cell.

S603. The mobile terminal receives indication information sent by the access network element corresponding to the serving cell.

The indication information is used to instruct the mobile terminal to initiate connection establishment to an access network element corresponding to a target cell if the mobile terminal generates a measurement report corresponding to the indication information.

S604. The mobile terminal receives measurement configuration information sent by the access network element corresponding to the serving cell.

When the access network element corresponding to the serving cell learns, by performing S602, that the mobile terminal currently moves at high speed, if a prior-art method for establishing, by the mobile terminal, a connection to the access network element corresponding to the target cell is still used, mobility of the mobile terminal is affected. Therefore, to ensure mobility of the mobile terminal, the access network element corresponding to the serving cell performs S603 to deliver the indication information to the mobile terminal.

The measurement configuration information and the indication information may be simultaneously delivered, that is, the S603 and S604 are implemented by using same signaling. Optionally, S604 may be performed before S603, or may be performed before or at the same time as S602, or may be performed before or at the same time as S601. For example, first, the mobile terminal receives the measurement configuration information, and then, when determining that the mobile terminal moves at high speed, the access network element delivers the indication information. In addition, optionally, both the S601 and S602 are not performed, that is, that the access network element delivers the indication information to the mobile terminal is not subject to a movement speed of the mobile terminal.

S605. The mobile terminal measures a target cell, so as to obtain a measurement result of the target cell.

S606. The mobile terminal generates a measurement report according to the measurement result.

S607. The mobile terminal determines whether the measurement report is a measurement report of a measurement reporting event corresponding to the indication information, and if yes, performs S608 (or S609, or S610), or if no, performs S611.

In this embodiment, the indication information is used to instruct the mobile terminal to initiate connection establishment to the access network element corresponding to the target cell if the mobile terminal generates the measurement report corresponding to the indication information. Therefore, when obtaining the measurement result, the mobile terminal in this embodiment does not determine whether an entering condition that is of a measurement reporting event and is met by the measurement result is an entering condition of the measurement reporting event corresponding to the indication information. Instead, provided that the measurement result meets an entering condition of a measurement reporting event, the mobile terminal directly generates the measurement result, and then, when performing S607, the mobile terminal determines whether the measurement report meets the measurement report corresponding to the indication information. It may be understood that, when an entering condition that is of a measurement reporting event and is met by the measurement result in S605 is not the entering condition of the measurement reporting event corresponding to the indication information, the measurement report generated in S606 is not the measurement report of the measurement reporting event corresponding to the indication information either. When the mobile terminal determines, by performing S607, that the mobile terminal generates the measurement report of the measurement reporting event corresponding to the indication information, the mobile terminal performs S608 (or S609, or S610).

Possibly, if the generated measurement report is not the measurement report of the measurement reporting event corresponding to the indication information, but the measurement report is generated by the mobile terminal according to the measurement result that meets an entering condition, of a measurement reporting event, different from the entering condition of the measurement reporting event corresponding to the indication information, the mobile terminal may continue to perform S611 according to the prior art.

S608. The mobile terminal determines whether the mobile terminal is in a DRX state, and if yes, performs S610, or if no, performs S611.

The DRX state is a short-cycle DRX state or a long-cycle DRX state.

S609. The mobile terminal determines whether the mobility state estimation of the mobile terminal is less than a speed threshold specified by the mobile terminal, and if no, performs S610, or if yes, performs S611.

When the mobile terminal determines that the mobility state estimation of the mobile terminal is greater than or equal to the speed threshold specified by the mobile terminal, the mobile terminal applies the indication information, that is, performs the following S610.

S608 and S609 are optional steps, that is, when this embodiment is implemented in an actual application, the mobile terminal may choose to perform S608 and/or S609 after performing S607, and a sequence of performing S608 and S609 is not limited. When the mobile terminal chooses not to perform S608 and S609, and the mobile terminal determines, by performing S607, that the mobile terminal generates the measurement report of the measurement reporting event corresponding to the indication information, the mobile terminal directly performs S610 according to the indication information.

S610. The mobile terminal initiates connection establishment to an access network element corresponding to the target cell.

Optionally, after the mobile terminal initiates connection establishment to the access network element corresponding to the target cell, the mobile terminal remains connected to the access network element corresponding to the serving cell.

S611. The mobile terminal sends the measurement report to the access network element corresponding to the serving cell.

If a step before S611 is S608 or S609, the measurement report sent by the mobile terminal is the measurement report of the measurement reporting event corresponding to the indication information. If a step before S611 is S607, the measurement report sent by the mobile terminal is the measurement report generated by the mobile terminal according to the measurement result that meets an entering condition, of a measurement reporting event, different from the entering condition of the measurement reporting event corresponding to the indication information.

When a step before S611 is S608 or S609, S611 in this embodiment is similar to the S512. That is, even if the mobile terminal receives the indication information and generates the measurement report of the measurement reporting event corresponding to the indication information, the mobile terminal chooses, according to a determining result in S608 and/or S609, to apply the indication information (that is, perform S610). Alternatively, the mobile terminal chooses, according to a determining result in S608 and/or S609, not to apply the indication information; still establishes, according to the prior art, a connection to the target cell, that is, performs S611; then, waits for the access network element to deliver, to the mobile terminal, an indication that connection establishment is allowed. The mobile terminal establishes a connection to the access network element corresponding to the target cell only when the mobile terminal receives the indication that connection establishment is allowed and that is delivered by the access network element to the mobile terminal.

It may be understood that, a communication procedure in the prior art already includes a protocol, a configuration, or the like about measurement report generation. Therefore, when this embodiment is applied based on the existing protocol or configuration, relatively less content and a relatively small range need to be adjusted and modified, and this facilitates implementation of this embodiment.

In this embodiment, after determining that a mobile terminal generates a measurement report of a measurement reporting event corresponding to indication information, the mobile terminal may directly initiate connection establishment to an access network element corresponding to a target cell. However, in the prior art, after a measurement result of the target cell meets an entering condition of a measurement reporting event, the mobile terminal generates a measurement report of the measurement reporting event, and then, sends the measurement report to an access network element corresponding to a serving cell, so as to wait for the access network element to deliver an indication that connection establishment is allowed. It can be learned, by comparing the prior art with this embodiment, that in this embodiment, provided that the mobile terminal generates the measurement report of the measurement reporting event corresponding to the indication information, the mobile terminal can establish a connection between the mobile terminal and the target cell in a timely manner, so that mobility of the mobile terminal is improved.

Figure 12A:
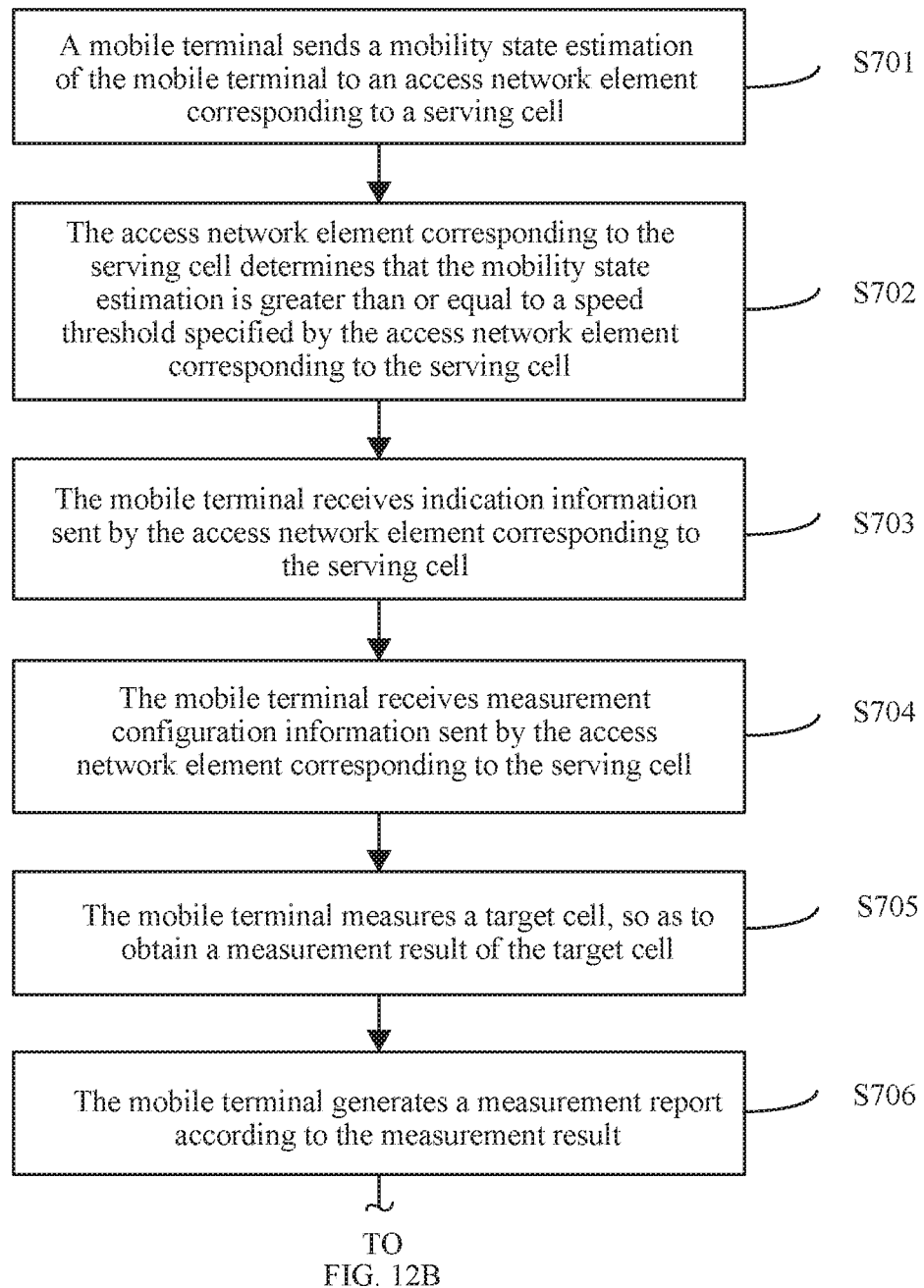
FIG. 12A to FIG. 12C are a schematic flowchart of Embodiment 7 of a processing method for establishing a connection to a cell by a mobile terminal according to the present invention.
Figure 12B:
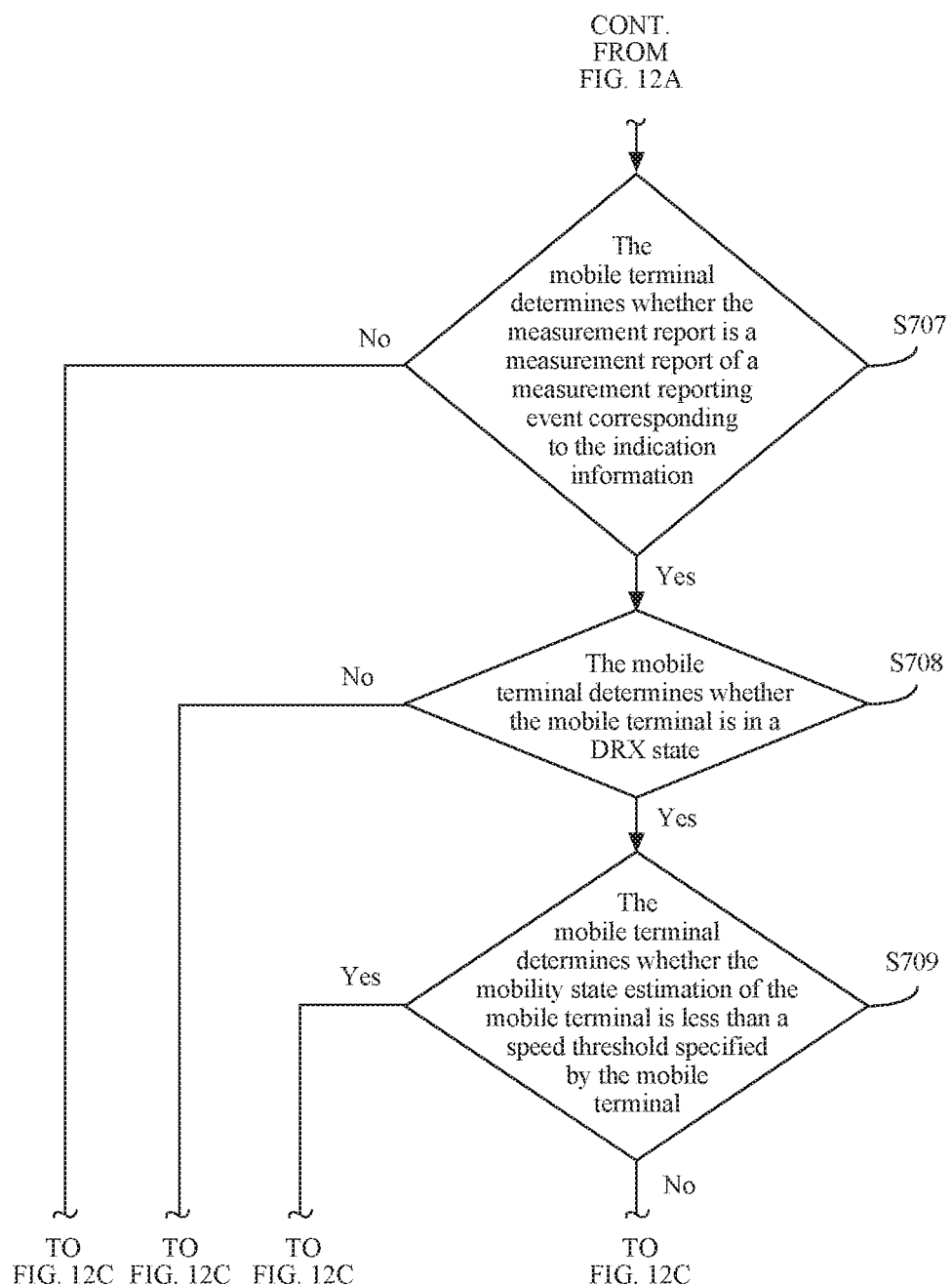
Figure 12C:
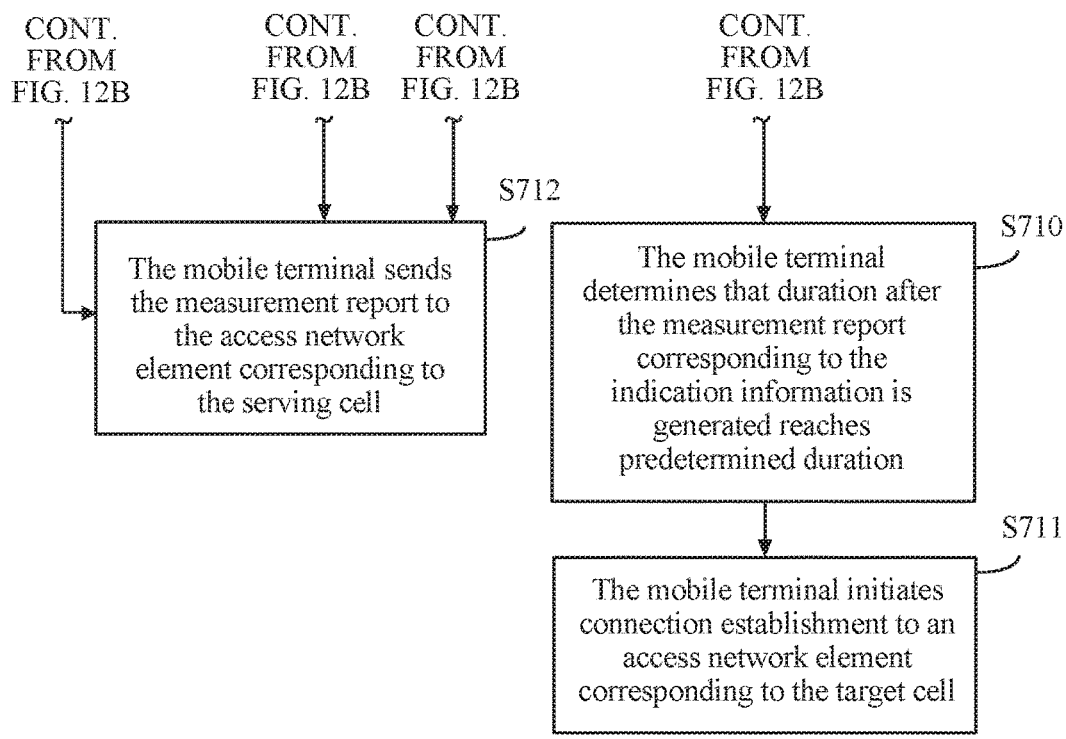

FIG. 12A to FIG. 12C are a schematic flowchart of Embodiment 7 of a processing method for establishing a connection to a cell by a mobile terminal according to the present invention. As shown in FIG. 12A to FIG. 12C, on the basis of the embodiment shown in FIG. 1 or FIG. 8, in an optional implementation manner, this embodiment specifically includes the following steps.

S701. A mobile terminal sends a mobility state estimation of the mobile terminal to an access network element corresponding to a serving cell.

The mobility state estimation is a mobility status of the mobile terminal obtained by the mobile terminal at a current moment. For example, when the mobile terminal moves along with a vehicle on which a user is located, the mobile terminal may learn whether the mobile terminal is in a high-mobility state. When the mobile terminal is in a high-mobility state, to ensure mobility of the mobile terminal, the mobile terminal needs to send the mobility state estimation of the mobile terminal to the access network element corresponding to the serving cell.

S702. The access network element corresponding to the serving cell determines that the mobility state estimation is greater than or equal to a speed threshold specified by the access network element corresponding to the serving cell.

S703. The mobile terminal receives indication information sent by the access network element corresponding to the serving cell.

The indication information is used to instruct the mobile terminal to initiate connection establishment to an access network element corresponding to a target cell if the mobile terminal generates a measurement report of a measurement reporting event corresponding to the indication information and duration after the measurement report of the measurement reporting event corresponding to the indication information is generated reaches predetermined duration.

S704. The mobile terminal receives measurement configuration information sent by the access network element corresponding to the serving cell.

When the access network element corresponding to the serving cell learns, by performing S702, that the mobile terminal currently moves at high speed, if a prior-art method for establishing, by the mobile terminal, a connection to the access network element corresponding to the target cell is still used, mobility of the mobile terminal is affected. Therefore, to ensure mobility of the mobile terminal, the access network element corresponding to the serving cell performs S703 to deliver the indication information to the mobile terminal.

The measurement configuration information and the indication information may be simultaneously delivered, that is, the S703 and S704 are implemented by using same signaling. Optionally, S704 may be performed before S703, or may be performed before or at the same time as S702, or may be performed before or at the same time as S701. For example, first, the mobile terminal receives the measurement configuration information, and then, when determining that the mobile terminal moves at high speed, the access network element delivers the indication information. In addition, optionally, both the S701 and S702 are not performed, that is, that the access network element delivers the indication information to the mobile terminal is not subject to a movement speed of the mobile terminal.

S705. The mobile terminal measures a target cell, so as to obtain a measurement result of the target cell.

S706. The mobile terminal generates a measurement report according to the measurement result.

S707. The mobile terminal determines whether the measurement report is a measurement report of a measurement reporting event corresponding to the indication information, and if yes, performs S708 (or S709, or S710), or if no, performs S712.

In this embodiment, the indication information is used to instruct the mobile terminal to initiate connection establishment to the access network element corresponding to the target cell if the mobile terminal generates the measurement report of the measurement reporting event corresponding to the indication information and the duration after the measurement report of the measurement reporting event corresponding to the indication information is generated reaches the predetermined duration. Therefore, when the mobile terminal determines, by performing S707, that the mobile terminal generates the measurement report of the measurement reporting event corresponding to the indication information, the mobile terminal performs S708 (or S709, or S710).

Possibly, if the generated measurement report does not meet the measurement report corresponding to the indication information, but the measurement report is generated by the mobile terminal according to the measurement result that meets an entering condition, of a measurement reporting event, different from an entering condition of the measurement reporting event corresponding to the indication information, the mobile terminal may continue, according to the prior art, that is, according to S712, to initiate connection establishment to the access network element corresponding to the target cell.

S708. The mobile terminal determines whether the mobile terminal is in a DRX state, and if yes, performs S710 or S709, or if no, performs S712.

The DRX state is a short-cycle DRX state or a long-cycle DRX state.

S709. The mobile terminal determines whether the mobility state estimation of the mobile terminal is less than a speed threshold specified by the mobile terminal, and if no, performs S710, or if yes, performs S712.

When the mobile terminal determines that the mobility state estimation of the mobile terminal is greater than or equal to the speed threshold specified by the mobile terminal, the mobile terminal applies the indication information, that is, performs the following S710.

S708 and S709 are optional steps, that is, when this embodiment is implemented in an actual application, the mobile terminal may choose to perform S708 and/or S709 after performing S707, and a sequence of performing S708 and S709 is not limited. In this embodiment, an example in which S709 is performed after S708 of determining that the mobile terminal is in a DRX state is performed is used.

S710. The mobile terminal determines that duration after the measurement report corresponding to the indication information is generated reaches predetermined duration.

Specifically, after the mobile terminal generates the measurement report of the measurement reporting event corresponding to the indication information, the mobile terminal may start a timer, and determine that the timer performs timing until a time threshold is reached.

The timer in this embodiment may be specifically a timer T312, or a new timer T313. In the prior art, before starting the timer T312, the mobile terminal needs to determine that a timer T310 has been started, and if the T310 is not started, the T312 cannot be started. However, in this embodiment, the timer T310 may be ignored, so as to improve cell handover efficiency and improve mobility of the mobile terminal.

S711. The mobile terminal initiates connection establishment to an access network element corresponding to the target cell.

It may be understood that, a communication procedure in the prior art already includes a protocol, a configuration, or the like about measurement report generation and waiting for the timer T312 to perform timing until the time threshold is reached. Therefore, when this embodiment is applied based on the existing protocol or configuration, relatively less content and a relatively small range need to be adjusted and modified, and this facilitates implementation of this embodiment.

Optionally, after the mobile terminal initiates connection establishment to the access network element corresponding to the target cell, the mobile terminal remains connected to the access network element corresponding to the serving cell.

S712. The mobile terminal sends the measurement report to the access network element corresponding to the serving cell.

If a step before S712 is S708 or S709, the measurement report sent by the mobile terminal is the measurement report of the measurement reporting event corresponding to the indication information. If a step before S712 is S707, the measurement report sent by the mobile terminal is the measurement report generated by the mobile terminal according to the measurement result that meets an entering condition, of a measurement reporting event, different from the entering condition of the measurement reporting event corresponding to the indication information.

When a step before S712 is S708 or S709, S712 in this embodiment is similar to the S410, that is, even if the mobile terminal receives the indication information and generates the measurement report of the measurement reporting event corresponding to the indication information, the mobile terminal chooses, according to a determining result in S708 and/or S709, to apply the indication information (that is, perform S710). Alternatively, the mobile terminal chooses, according to a determining result in S708 and/or S709, not to apply the indication information; still establishes, according to the prior art, a connection to the target cell, that is, performs S712 to send the measurement report to the access network element corresponding to the serving cell; then, waits for the access network element to deliver, to the mobile terminal, an indication that connection establishment is allowed. The mobile terminal establishes a connection to the target cell only when the mobile terminal receives the indication that connection establishment is allowed and that is delivered by the access network element to the mobile terminal.

In this embodiment, after generating a measurement report of a measurement reporting event corresponding to indication information, a mobile terminal may ignore a timer T310, and start a T312 immediately. After the timer T312 performs timing until a time threshold is reached, the mobile terminal can establish a connection between the mobile terminal and a target cell according to an indication of the indication information, so that the mobile terminal can be handed over from a serving cell to the target cell in a timely manner, and mobility of the mobile terminal is improved.

Figure 13A:
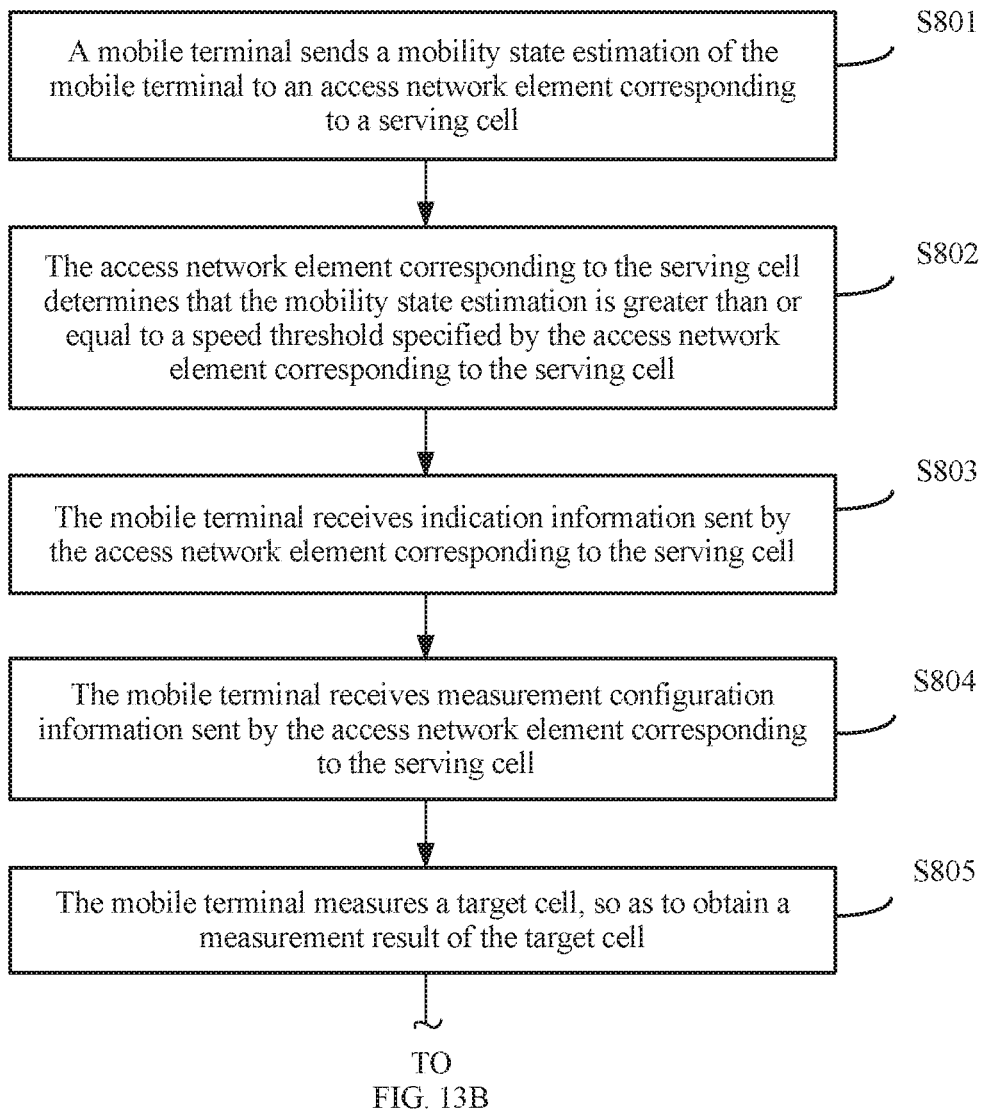
FIG. 13A to FIG. 13C are a schematic flowchart of Embodiment 8 of a processing method for establishing a connection to a cell by a mobile terminal according to the present invention.
Figure 13B:
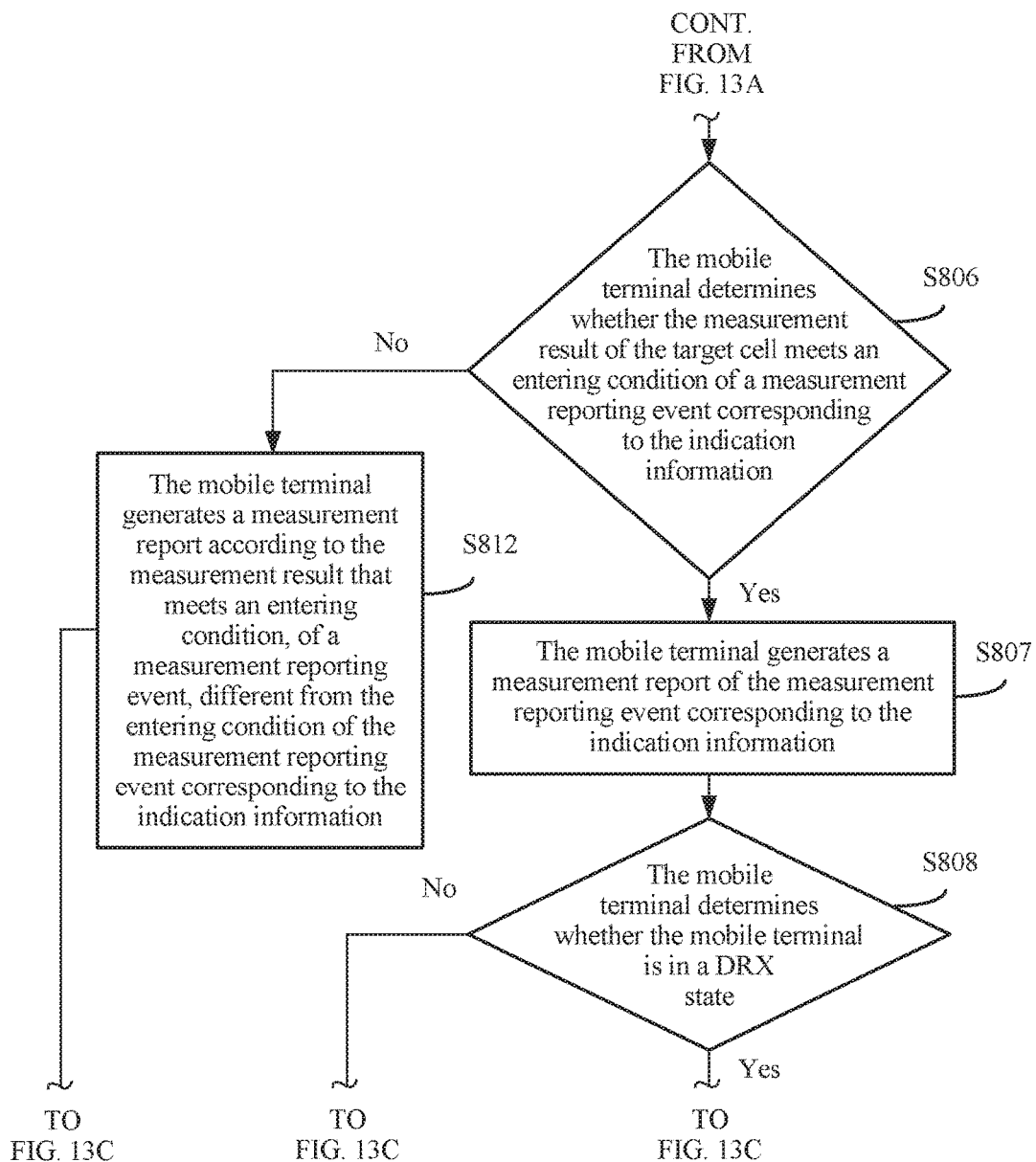
Figure 13C:
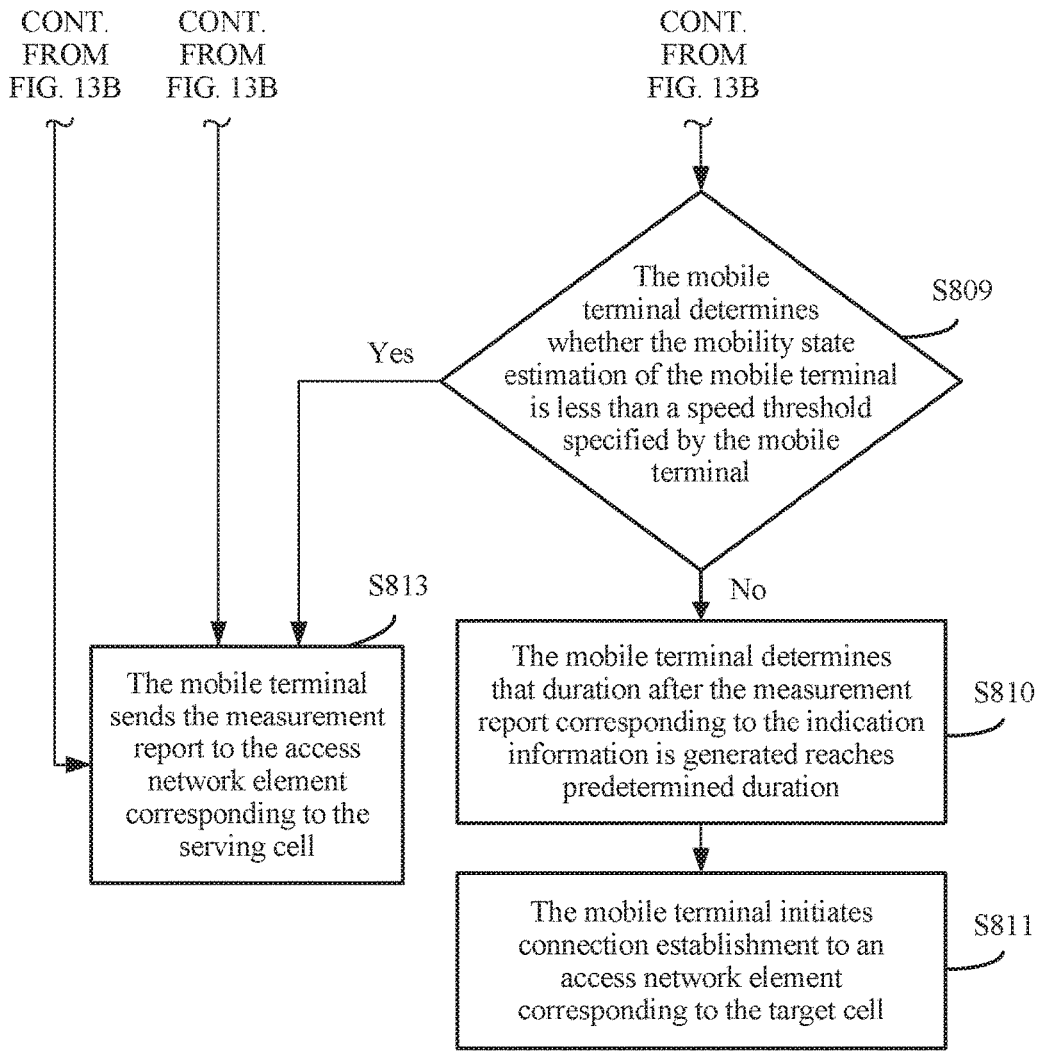

FIG. 13A to FIG. 13C are a schematic flowchart of Embodiment 8 of a processing method for establishing a connection to a cell by a mobile terminal according to the present invention. As shown in FIG. 13A to FIG. 13C, on the basis of the embodiment shown in FIG. 1 or FIG. 2, in an optional implementation manner, this embodiment specifically includes the following steps.

S801. A mobile terminal sends a mobility state estimation of the mobile terminal to an access network element corresponding to a serving cell.

The mobility state estimation is a mobility status of the mobile terminal obtained by the mobile terminal at a current moment. For example, when the mobile terminal moves along with a vehicle on which a user is located, the mobile terminal may learn whether the mobile terminal is in a high-mobility state. When the mobile terminal is in a high-mobility state, to ensure mobility of the mobile terminal, the mobile terminal needs to send the mobility state estimation of the mobile terminal to the access network element corresponding to the serving cell.

S802. The access network element corresponding to the serving cell determines that the mobility state estimation is greater than or equal to a speed threshold specified by the access network element corresponding to the serving cell.

S803. The mobile terminal receives indication information sent by the access network element corresponding to the serving cell.

The indication information is used to instruct the mobile terminal to initiate connection establishment to an access network element corresponding to a target cell if the mobile terminal generates a measurement report of a measurement reporting event corresponding to the indication information and duration after the measurement report of the measurement reporting event corresponding to the indication information is generated reaches predetermined duration.

S804. The mobile terminal receives measurement configuration information sent by the access network element corresponding to the serving cell.

When the access network element corresponding to the serving cell learns, by performing S802, that the mobile terminal currently moves at high speed, if a prior-art method for establishing, by the mobile terminal, a connection to the access network element corresponding to the target cell is still used, mobility of the mobile terminal is affected. Therefore, to ensure mobility of the mobile terminal, the access network element corresponding to the serving cell performs S803 to deliver the indication information to the mobile terminal.

The measurement configuration information and the indication information may be simultaneously delivered, that is, the S803 and S804 are implemented by using same signaling. Optionally, S804 may be performed before S803, or may be performed before or at the same time as S802, or may be performed before or at the same time as S801. For example, first, the mobile terminal receives the measurement configuration information, and then, when determining that the mobile terminal moves at high speed, the access network element delivers the indication information. In addition, optionally, both the S801 and S802 are not performed, that is, that the access network element delivers the indication information to the mobile terminal is not subject to a movement speed of the mobile terminal.

S805. The mobile terminal measures a target cell, so as to obtain a measurement result of the target cell.

S806. The mobile terminal determines whether the measurement result of the target cell meets an entering condition of a measurement reporting event corresponding to the indication information, and if yes, performs S807, or if no, performs S812.

In this embodiment, the indication information is used to instruct the mobile terminal to initiate connection establishment to the access network element corresponding to the target cell if the measurement result meets the entering condition of the measurement reporting event corresponding to the indication information and the mobile terminal generates the measurement report of the measurement reporting event corresponding to the indication information. Therefore, the mobile terminal in this embodiment determines, by performing S806, that the measurement result meets the entering condition of the measurement reporting event corresponding to the indication information.

Possibly, if the measurement result meets neither the entering condition of the measurement reporting event corresponding to the indication information nor an entering condition, of a measurement reporting event, different from the entering condition of the measurement reporting event corresponding to the indication information, this embodiment ends, that is, the mobile terminal no longer performs the following steps.

However, if the measurement result does not meet the entering condition of the measurement reporting event corresponding to the indication information but meets an entering condition, of a measurement reporting event, different from the entering condition of the measurement reporting event corresponding to the indication information, in this embodiment, according to the prior art, S812 is performed and S813 is subsequently performed. FIG. 13 uses an example in which the measurement result does not meet the entering condition of the measurement reporting event corresponding to the indication information but meets an entering condition, of a measurement reporting event, different from the entering condition of the measurement reporting event corresponding to the indication information.

S807. The mobile terminal generates a measurement report of the measurement reporting event corresponding to the indication information.

S808. The mobile terminal determines whether the mobile terminal is in a DRX state, and if yes, performs S810 or S809, or if no, performs S813.

The DRX state is a short-cycle DRX state or a long-cycle DRX state.

S809. The mobile terminal determines whether the mobility state estimation of the mobile terminal is less than a speed threshold specified by the mobile terminal, and if no, performs S810, or if yes, performs S813.

That is, when the mobile terminal determines that the mobility state estimation of the mobile terminal is greater than or equal to the speed threshold specified by the mobile terminal, the mobile terminal applies the indication information, that is, performs the following SS810. In addition, S808 and S809 are optional steps, that is, when this embodiment is implemented in an actual application, the mobile terminal may choose to perform S808 and/or S809 after performing S807, and a sequence of performing S808 and S809 is not limited. In this embodiment, an example in which S809 is performed after S808 of determining that the mobile terminal is in a DRX state is performed is used.

S810. The mobile terminal determines that duration after the measurement report corresponding to the indication information is generated reaches predetermined duration.

Specifically, after the mobile terminal generates the measurement report of the measurement reporting event corresponding to the indication information, the mobile terminal may start a timer, and determine that the timer performs timing until a time threshold is reached.

The timer in this embodiment may be specifically a timer T312, or a new timer T313. In the prior art, before starting the timer T312, the mobile terminal needs to determine that a timer T310 has been started, and if the T310 is not started, the T312 cannot be started. However, in this embodiment, the timer T310 may be ignored, so as to improve cell handover efficiency and improve mobility of the mobile terminal.

S811. The mobile terminal initiates connection establishment to an access network element corresponding to the target cell.

It may be understood that, a communication procedure in the prior art already includes a protocol, a configuration, or the like about measurement report generation and waiting for the timer T312 to perform timing until the time threshold is reached. Therefore, when this embodiment is applied based on the existing protocol or configuration, relatively less content and a relatively small range need to be adjusted and modified, and this facilitates implementation of this embodiment.

Optionally, after the mobile terminal initiates connection establishment to the access network element corresponding to the target cell, the mobile terminal remains connected to the access network element corresponding to the serving cell.

S812. The mobile terminal generates a measurement report according to the measurement result that meets an entering condition, of a measurement reporting event, different from the entering condition of the measurement reporting event corresponding to the indication information.

S813. The mobile terminal sends the measurement report to the access network element corresponding to the serving cell.

If a step before S813 is S808 or S809, the measurement report sent by the mobile terminal is the measurement report of the measurement reporting event corresponding to the indication information. If a step before S813 is S812, the measurement report sent by the mobile terminal is the measurement report generated by the mobile terminal according to the measurement result that meets an entering condition, of a measurement reporting event, different from the entering condition of the measurement reporting event corresponding to the indication information.

When a step before S813 is S808 or S809, it indicates that even if the mobile terminal receives the indication information and generates the measurement report of the measurement reporting event corresponding to the indication information, the mobile terminal chooses, according to a determining result in S808 and/or S809, to apply the indication information (that is, perform S810). Alternatively, the mobile terminal chooses, according to a determining result in S808 and/or S809, not to apply the indication information; still establishes, according to the prior art, a connection to the target cell, that is, performs S813 to send the measurement report to the access network element corresponding to the serving cell; then, waits for the access network element to deliver, to the mobile terminal, an indication that connection establishment is allowed. The mobile terminal establishes a connection to the target cell only when the mobile terminal receives the indication that connection establishment is allowed and that is delivered, to the mobile terminal, by the access network element corresponding to the serving cell.

In this embodiment, after generating a measurement report of a measurement reporting event corresponding to indication information, a mobile terminal may ignore a timer T310, and start a T312 immediately. After the timer T312 performs timing until a time threshold is reached, the mobile terminal can establish a connection between the mobile terminal and a target cell according to an indication of the indication information, so that the mobile terminal can be handed over from a serving cell to the target cell in a timely manner, and mobility of the mobile terminal is improved.

Figure 14A:
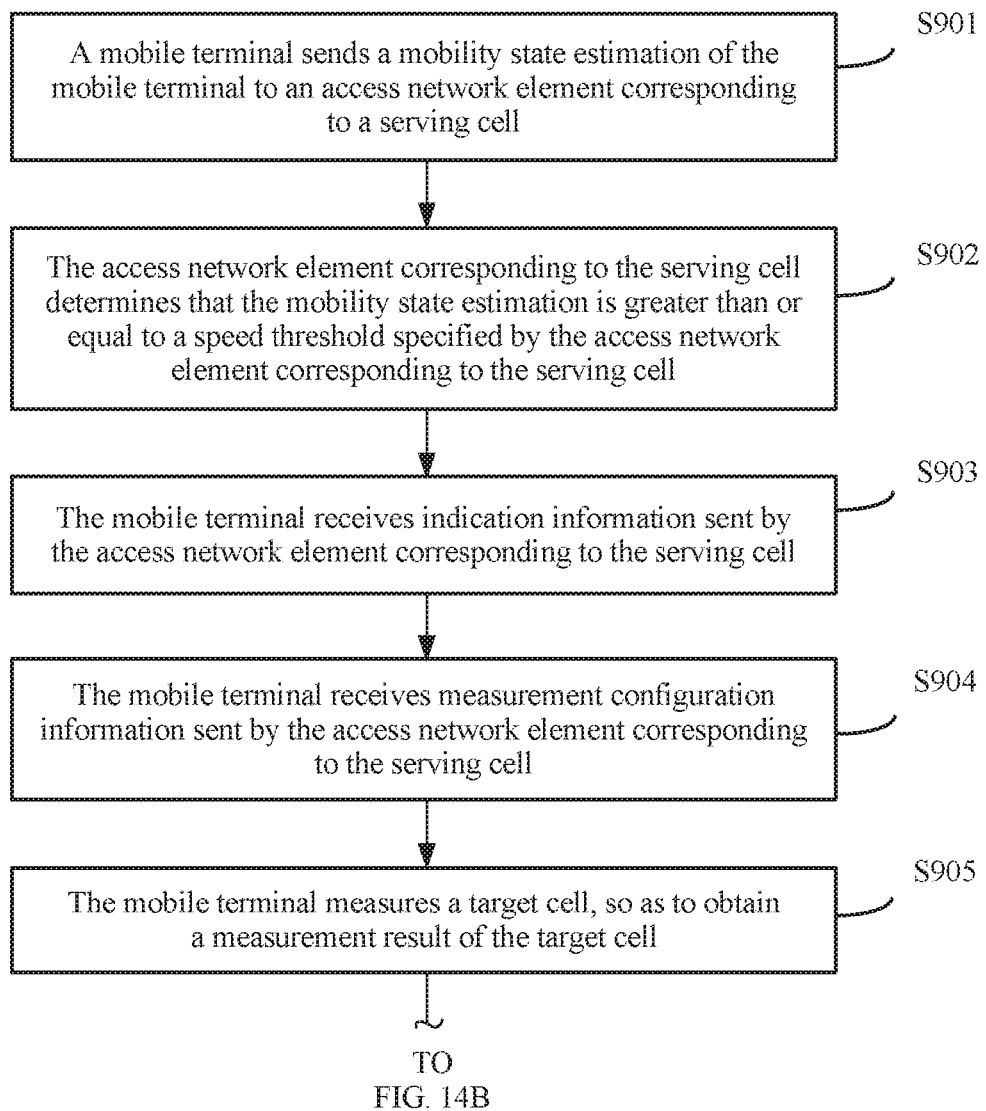
FIG. 14A to FIG. 14C are a schematic flowchart of Embodiment 9 of a processing method for establishing a connection to a cell by a mobile terminal according to the present invention.
Figure 14B:
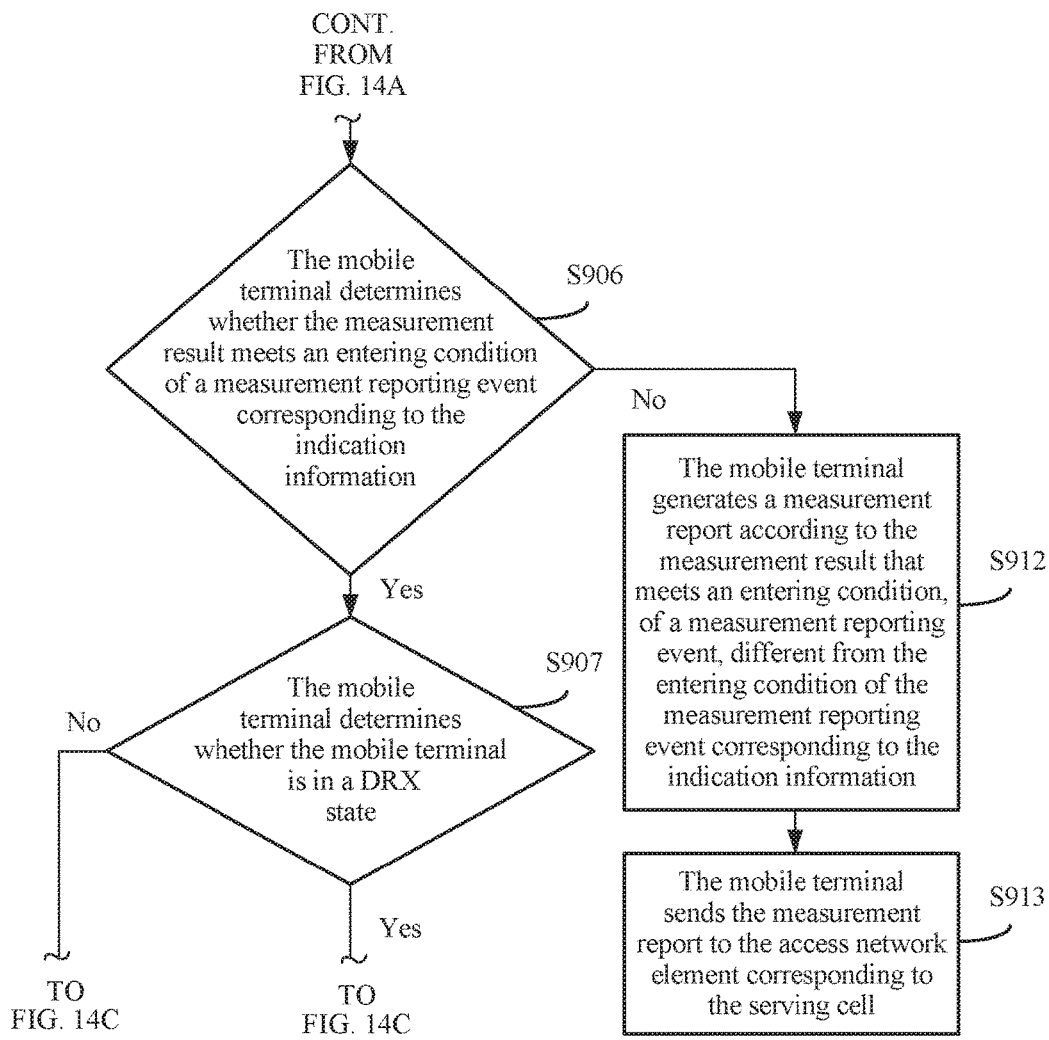
Figure 14C:
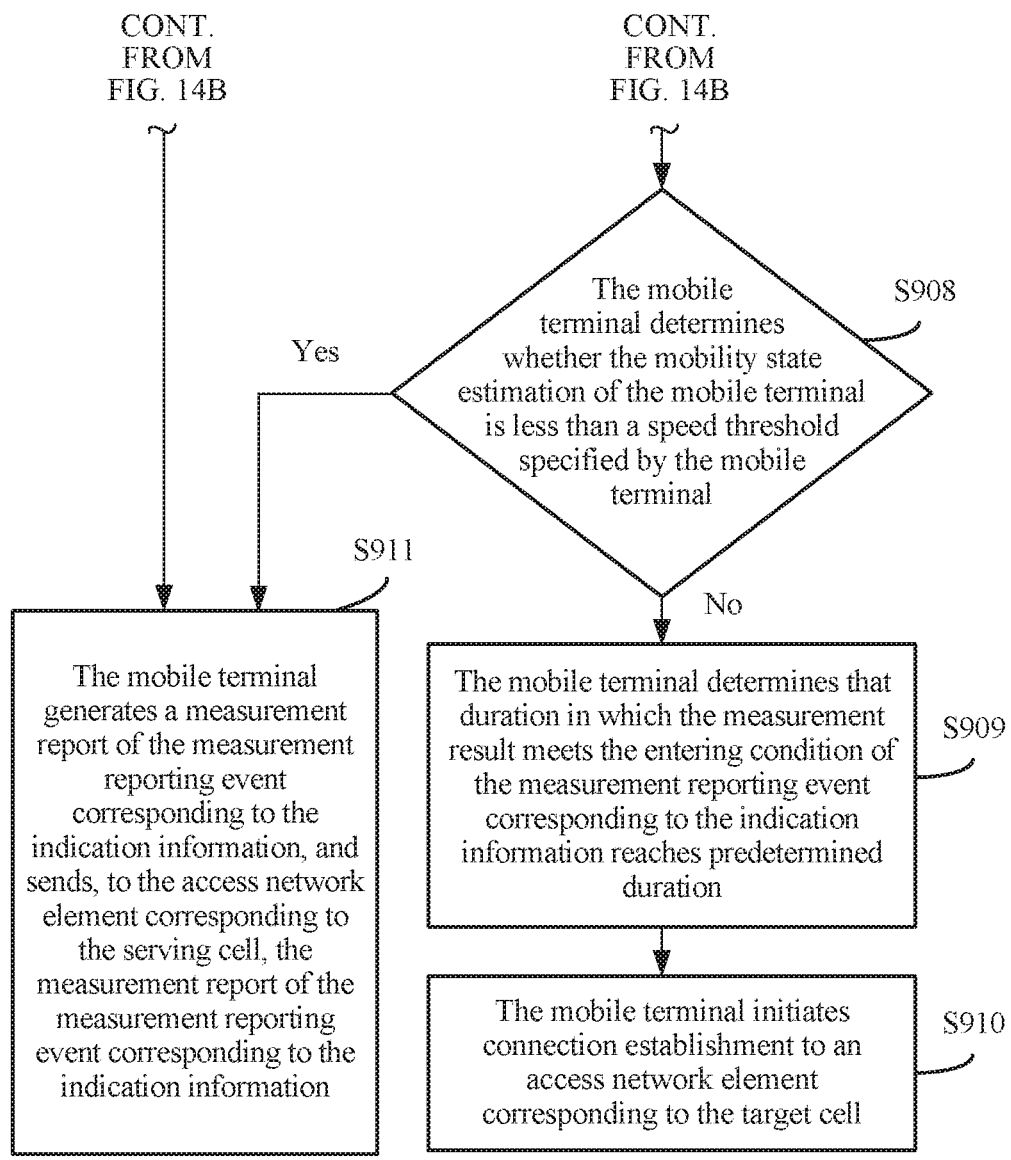

FIG. 14A to FIG. 14C are a schematic flowchart of Embodiment 9 of a processing method for establishing a connection to a cell by a mobile terminal according to the present invention. As shown in FIG. 14A to FIG. 14C, on the basis of the embodiment shown in FIG. 1, this embodiment gives a further description, and specifically includes the following steps.

S901. A mobile terminal sends a mobility state estimation of the mobile terminal to an access network element corresponding to a serving cell.

The mobility state estimation (MSE) is a mobility status of the mobile terminal obtained by the mobile terminal at a current moment. For example, when the mobile terminal moves along with a vehicle on which a user is located, the mobile terminal may learn whether the mobile terminal is in a high-mobility state. When the mobile terminal is in a high-mobility state, to ensure mobility of the mobile terminal, the mobile terminal needs to send the mobility state estimation of the mobile terminal to the access network element corresponding to the serving cell.

S902. The access network element corresponding to the serving cell determines that the mobility state estimation is greater than or equal to a speed threshold specified by the access network element corresponding to the serving cell.

S903. The mobile terminal receives indication information sent by the access network element corresponding to the serving cell.

The indication information is used to instruct the mobile terminal to initiate connection establishment to an access network element corresponding to a target cell if a measurement result meets an entering condition of a measurement reporting event corresponding to the indication information and duration in which the measurement result meets the entering condition of the measurement reporting event corresponding to the indication information reaches predetermined duration.

S904. The mobile terminal receives measurement configuration information sent by the access network element corresponding to the serving cell.

When the access network element corresponding to the serving cell learns, by performing S902, that the mobile terminal currently moves at high speed, if a prior-art method for establishing, by the mobile terminal, a connection to the access network element corresponding to the target cell is still used, mobility of the mobile terminal is affected. Therefore, to ensure mobility of the mobile terminal, the access network element corresponding to the serving cell performs S903 to deliver the indication information to the mobile terminal.

The measurement configuration information and the indication information may be simultaneously delivered, that is, the S903 and S904 are implemented by using same signaling. Optionally, S904 may be performed before S903, or may be performed before or at the same time as S902, or may be performed before or at the same time as S901. For example, first, the mobile terminal receives the measurement configuration information, and then, when determining that the mobile terminal moves at high speed, the access network element delivers the indication information. In addition, optionally, both the S901 and S902 are not performed, that is, that the access network element delivers the indication information to the mobile terminal is not subject to a movement speed of the mobile terminal.

S905. The mobile terminal measures a target cell, so as to obtain a measurement result of the target cell.

S906. The mobile terminal determines whether the measurement result meets an entering condition of a measurement reporting event corresponding to the indication information, and if yes, performs S907 or S908 or S909, or if no, performs S912.

In this embodiment, the indication information is used to instruct the mobile terminal to initiate connection establishment to the access network element corresponding to the target cell if the measurement result meets the entering condition of the measurement reporting event corresponding to the indication information and the duration in which the measurement result meets the entering condition of the measurement reporting event corresponding to the indication information reaches the predetermined duration. Therefore, the mobile terminal in this embodiment determines, by performing S906, that the measurement result meets the entering condition of the measurement reporting event corresponding to the indication information.

Possibly, if the measurement result meets neither the entering condition of the measurement reporting event corresponding to the indication information nor an entering condition, of a measurement reporting event, different from the entering condition of the measurement reporting event corresponding to the indication information, this embodiment ends, that is, the mobile terminal no longer performs the following steps.

However, if the measurement result does not meet the entering condition of the measurement reporting event corresponding to the indication information but meets an entering condition, of a measurement reporting event, different from the entering condition of the measurement reporting event corresponding to the indication information, in this embodiment, according to the prior art, S912 is performed and S913 is subsequently performed. FIG. 14 uses an example in which the measurement result does not meet the entering condition of the measurement reporting event corresponding to the indication information but meets an entering condition, of a measurement reporting event, different from the entering condition of the measurement reporting event corresponding to the indication information.

S907. The mobile terminal determines whether the mobile terminal is in a DRX state, and if yes, performs S909 or S908, or if no, performs S911.

The DRX state is a short-cycle DRX state or a long-cycle DRX state.

S908. The mobile terminal determines whether the mobility state estimation of the mobile terminal is less than a speed threshold specified by the mobile terminal, and if no, performs S909, or if yes, performs S911.

When the mobile terminal determines that the mobility state estimation of the mobile terminal is greater than or equal to the speed threshold specified by the mobile terminal, the mobile terminal applies the indication information, that is, performs the following S909. In addition, S907 and S908 are optional steps, that is, when this embodiment is implemented in an actual application, the mobile terminal may choose to perform S907 and/or S908 after performing S906, and a sequence of performing S907 and S908 is not limited. In this embodiment, an example in which S908 is performed after S907 of determining that the mobile terminal is in a DRX state is performed is used.

S909. The mobile terminal determines that duration in which the measurement result meets the entering condition of the measurement reporting event corresponding to the indication information reaches predetermined duration.

Specifically, when determining that the measurement result meets the entering condition of the measurement reporting event corresponding to the indication information, the mobile terminal starts a timer, and determines that when the timer performs timing until a time threshold is reached, the measurement result still meets the entering condition of the measurement reporting event corresponding to the indication information.

The timer in this embodiment may be specifically a timer T312. In the prior art, before starting the timer T312, the mobile terminal needs to determine that a measurement report is generated and a timer T310 has been started. However, in this embodiment, whether a measurement report is generated may be ignored and the timer T310 may be ignored, so as to improve cell handover efficiency and improve mobility of the mobile terminal.

S910. The mobile terminal initiates connection establishment to an access network element corresponding to the target cell.

It may be understood that, a communication procedure in the prior art already includes a protocol, a configuration, or the like about starting the timer T312 and waiting for the timer T312 to perform timing until the time threshold is reached. Therefore, when this embodiment is applied based on the existing protocol or configuration, relatively less content and a relatively small range need to be adjusted and modified, and this facilitates implementation of this embodiment.

Optionally, after the mobile terminal initiates connection establishment to the access network element corresponding to the target cell, the mobile terminal remains connected to the access network element corresponding to the serving cell.

S911. The mobile terminal generates a measurement report of the measurement reporting event corresponding to the indication information, and sends, to the access network element corresponding to the serving cell, the measurement report of the measurement reporting event corresponding to the indication information.

In this embodiment, even if the mobile terminal receives the indication information and the duration in which the measurement result of the target cell meets the entering condition of the measurement reporting event corresponding to the indication information, the mobile terminal may choose, according to a determining result in S907 and/or S908, to apply the indication information (that is, perform S909). Alternatively, the mobile terminal chooses, according to a determining result in S907 and/or S908, not to apply the indication information; still establishes, according to the prior art, a connection to corresponding to the target cell, that is, performs S911 to generate the measurement report of the measurement reporting event corresponding to the indication information and send, to the access network element corresponding to the serving cell, the measurement report of the measurement reporting event corresponding to the indication information; and waits for the access network element corresponding to the serving cell to deliver, to the mobile terminal, an indication that connection establishment is allowed. The mobile terminal establishes a connection to the access network element corresponding to the target cell only when the mobile terminal receives the indication that connection establishment is allowed and that is delivered, to the mobile terminal, by the access network element corresponding to the serving cell.

S912. The mobile terminal generates a measurement report according to the measurement result that meets an entering condition, of a measurement reporting event, different from the entering condition of the measurement reporting event corresponding to the indication information.

S913. The mobile terminal sends the measurement report to the access network element corresponding to the serving cell.

In this embodiment, after determining that a measurement result of a target cell meets an entering condition of a measurement reporting event corresponding to indication information, a mobile terminal may ignore a timer T310, and start a T312 immediately. After the timer T312 performs timing until a time threshold is reached, the mobile terminal can establish a connection between the mobile terminal and the target cell according to an indication of the indication information, so that the mobile terminal can be handed over from a serving cell to the target cell in a timely manner, and mobility of the mobile terminal is improved.

Figure 15A:
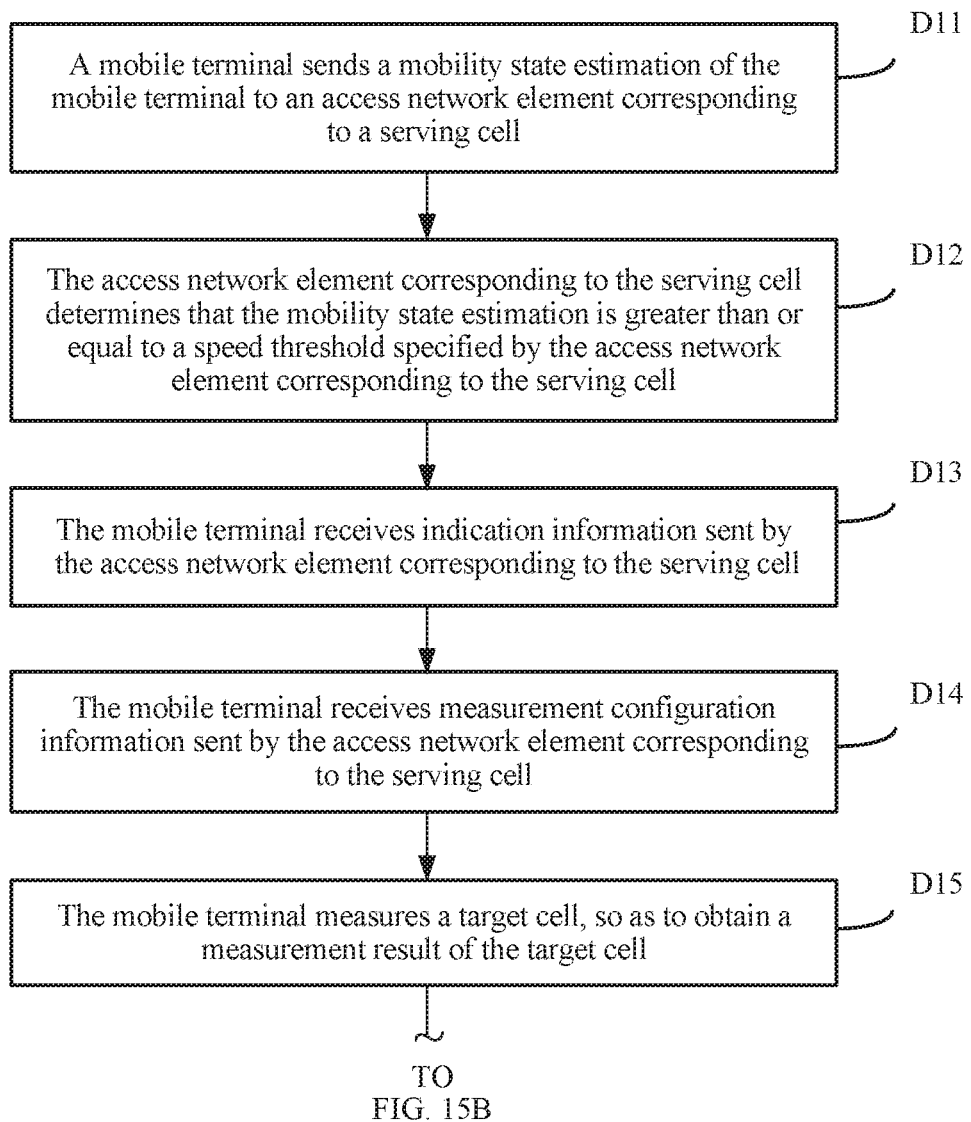
FIG. 15A to FIG. 15C are a schematic flowchart of Embodiment 10 of a processing method for establishing a connection to an access network element by a mobile terminal according to the present invention.
Figure 15B:
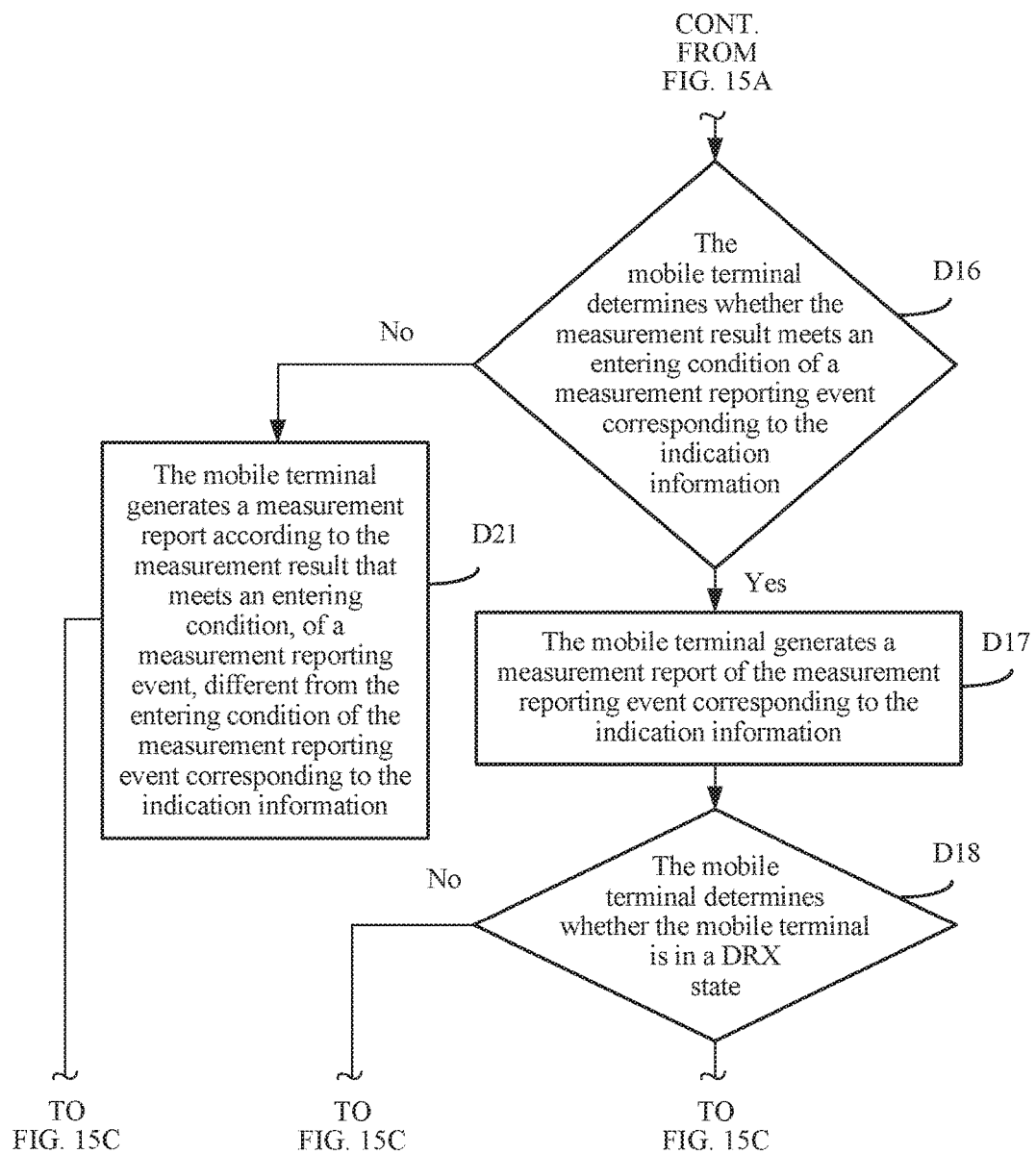
Figure 15C:
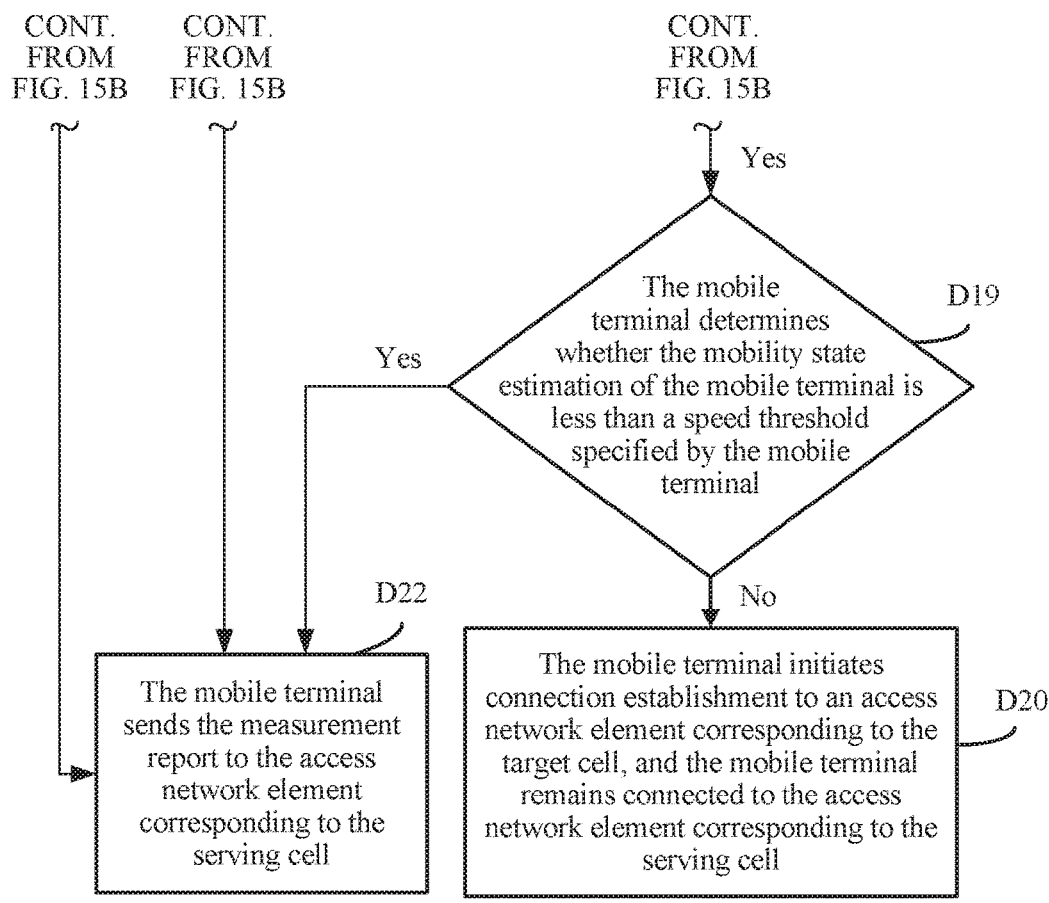

FIG. 15A to FIG. 15C are a schematic flowchart of Embodiment 10 of a processing method for establishing a connection to an access network element by a mobile terminal according to the present invention. As shown in FIG. 15A to FIG. 15C, in this embodiment, on the basis of any one of the embodiments, when or after initiating connection establishment to an access network element corresponding to a target cell, a mobile terminal further remains connected to an access network element corresponding to a serving cell. Specifically, a preferred implementation manner is as follows.

D11. The mobile terminal sends a mobility state estimation of the mobile terminal to the access network element corresponding to the serving cell.

The mobility state estimation (MSE) is a mobility status of the mobile terminal obtained by the mobile terminal at a current moment. For example, when the mobile terminal moves along with a vehicle on which a user is located, the mobile terminal may learn whether the mobile terminal is in a high-mobility state. When the mobile terminal is in a high-mobility state, to ensure mobility of the mobile terminal, the mobile terminal needs to send the mobility state estimation of the mobile terminal to the access network element corresponding to the serving cell.

D12. The access network element corresponding to the serving cell determines that the mobility state estimation is greater than or equal to a speed threshold specified by the access network element.

D13. The mobile terminal receives indication information sent by the access network element corresponding to the serving cell.

The indication information is used to instruct the mobile terminal to initiate connection establishment to the access network element corresponding to the target cell if a measurement result meets an entering condition of a measurement reporting event corresponding to the indication information and the mobile terminal generates a measurement report of the measurement reporting event corresponding to the indication information.

D14. The mobile terminal receives measurement configuration information sent by the access network element corresponding to the serving cell.

When the access network element corresponding to the serving cell learns, by performing D12, that the mobile terminal currently moves at high speed, if a prior-art method for establishing, by the mobile terminal, a connection to the access network element corresponding to the target cell is still used, mobility of the mobile terminal is affected. Therefore, to ensure mobility of the mobile terminal, the access network element corresponding to the serving cell performs D13 to deliver the indication information to the mobile terminal.

The measurement configuration information and the indication information may be simultaneously delivered, that is, the D13 and D14 are implemented by using same signaling. Optionally, D14 may be performed before D13, or may be performed before or at the same time as D12, or may be performed before or at the same time as D11. For example, first, the mobile terminal receives the measurement configuration information, and then, when determining that the mobile terminal moves at the high speed, the access network element corresponding to the serving cell delivers the indication information. In addition, optionally, both the D11 and D12 are not performed, that is, that the access network element delivers the indication information to the mobile terminal is not subject to a movement speed of the mobile terminal.

D15. The mobile terminal measures the target cell, so as to obtain a measurement result of the target cell.

D16. The mobile terminal determines whether the measurement result meets an entering condition of a measurement reporting event corresponding to the indication information, and if yes, performs D17, or if no, performs D21.

D17. The mobile terminal generates a measurement report of the measurement reporting event corresponding to the indication information.

D18. The mobile terminal determines whether the mobile terminal is in a DRX state, and if yes, performs D20 or D19, or if no, performs D22.

It may be understood that, if the mobile terminal establishes a connection to the target cell provided that the mobile terminal determines, at any moment, that the measurement result of the target cell meets the entering condition of the measurement reporting event corresponding to the indication information, control of a network-side device (such as a base station or a base station controller) on the mobile terminal is weakened. However, there is relatively great impact on mobility when the mobile terminal is in a short-cycle DRX state or a long-cycle DRX state. Therefore, optionally, when the mobile terminal in this embodiment is in a short-cycle DRX state or a long-cycle DRX state, the mobile terminal establishes a connection to the target cell according to an indication of the indication information, that is, the mobile terminal further needs to perform D18 after performing D17.

The DRX state is a short-cycle DRX state or a long-cycle DRX state.

D19. The mobile terminal determines whether the mobility state estimation of the mobile terminal is less than a speed threshold specified by the mobile terminal, and if no, performs D20, or if yes, performs D22.

When the mobile terminal is located in a critical area of the serving cell and the target cell, if the mobile terminal moves at lower speed, "ping-pong handover" between the target cell and the serving cell more likely occurs in the mobile terminal. To avoid a situation in which ping-pong handover occurs, preferably, D19 needs to be performed. That is, when the mobile terminal determines that the mobility state estimation of the mobile terminal is greater than or equal to the speed threshold specified by the mobile terminal, the mobile terminal applies the indication information, that is, performs the following D20.

D20. The mobile terminal initiates connection establishment to the access network element corresponding to the target cell, and the mobile terminal remains connected to the access network element corresponding to the serving cell.

For example, as the mobile terminal moves, the mobile terminal enters a coverage area of the target cell. When determining, by performing the D15 and D16, that a measurement result of a target cell A meets the entering condition of the measurement reporting event corresponding to the indication information, and after performing D17 or D17 to D19, the mobile terminal establishes a connection between the mobile terminal and the target cell A. However, in this case, a location of the mobile terminal is in an overlapped coverage area between the serving cell and the target cell A. If the mobile terminal still remains connected to the serving cell, in a process in which the mobile terminal obtains a communication service, the serving cell may keep a connection between the mobile terminal and a communications network disconnected, and the target cell A may enable the mobile terminal to obtain experience of relatively large throughput. For example, a center frequency of the serving cell is 800 MHz, and a center frequency of the target cell is 1800 MHz. After the mobile terminal establishes a connection to the target cell, if the mobile terminal still remains connected to the serving cell, in a process in which the mobile terminal obtains a communication service, in addition to from the target cell operating at 1800 MHz, usable wireless resources may be from the serving cell operating at 800 MHz. That is, wireless resources that can be used by the mobile terminal include wireless resources in the serving cell and the target cell, and the wireless resources in the serving cell and the target cell may be aggregated. By means of wireless resource aggregation, a higher peak rate and larger throughput may be implemented.

D21. The mobile terminal generates a measurement report according to the measurement result that meets an entering condition, of a measurement reporting event, different from the entering condition of the measurement reporting event corresponding to the indication information.

It should be noted that, in the D16, if the measurement result meets neither the entering condition of the measurement reporting event corresponding to the indication information nor an entering condition, of a measurement reporting event, different from the entering condition of the measurement reporting event corresponding to the indication information, the mobile terminal does not initiate connection establishment to the access network element corresponding to the target cell either, that is, this embodiment ends after D16. However, possibly, if the measurement result does not meet the entering condition of the measurement reporting event corresponding to the indication information but meets an entering condition, of a measurement reporting event, different from the entering condition of the measurement reporting event corresponding to the indication information, in this embodiment, according to the prior art, D21 is performed and D22 is subsequently performed. FIG. 15 uses an example in which the measurement result does not meet the entering condition of the measurement reporting event corresponding to the indication information but meets an entering condition, of a measurement reporting event, different from the entering condition of the measurement reporting event corresponding to the indication information.

D22. The mobile terminal sends the measurement report to the access network element corresponding to the serving cell.

If a step before D22 is D18 or D19, the measurement report sent by the mobile terminal is the measurement report of the measurement reporting event corresponding to the indication information. If a step before D22 is D21, the measurement report sent by the mobile terminal is the measurement report generated by the mobile terminal according to the measurement result that meets an entering condition, of a measurement reporting event, different from the entering condition of the measurement reporting event corresponding to the indication information.

When a step before D22 is D18 or D19, it indicates that even if the mobile terminal receives the indication information, the measurement result of the target cell meets the entering condition of the measurement reporting event corresponding to the indication information, and the mobile terminal generates the measurement report of the measurement reporting event corresponding to the indication information, the mobile terminal chooses, according to a determining result in D18 and/or D19, to apply the indication information (that is, performs D20). Alternatively, the mobile terminal chooses, according to a determining result in D18 and/or D19, not to apply the indication information; still establishes a connection to the target cell according to the prior art, that is, performs D22 to send the measurement report to the access network element corresponding to the serving cell; then, waits for the access network element corresponding to the serving cell to deliver, to the mobile terminal, an indication that connection establishment is allowed. The mobile terminal establishes a connection to the access network element corresponding to the target cell only when the mobile terminal receives the indication that connection establishment is allowed and that is delivered by the access network element to the mobile terminal.

In this embodiment, after determining that a measurement result of a target cell meets an entering condition of a measurement reporting event corresponding to indication information, a mobile terminal generates a measurement report of the measurement reporting event corresponding to the indication information, and then, the mobile terminal may directly initiate connection establishment to an access network element corresponding to the target cell. However, in the prior art, after the measurement result of the target cell meets an entering condition of a measurement reporting event, the mobile terminal generates a measurement report of the measurement reporting event, and then, sends the measurement report to an access network element corresponding to a serving cell, so as to wait for the access network element to deliver an indication that connection establishment is allowed. It can be learned, by comparing the prior art with this embodiment, that in this embodiment, provided that the measurement result of the target cell meets the entering condition of the measurement reporting event corresponding to the indication information and the mobile terminal generates the measurement report of the measurement reporting event corresponding to the indication information, the mobile terminal can establish a connection between the mobile terminal and the target cell in a timely manner, so that cell handover efficiency is improved and mobility of the mobile terminal is improved.

For same steps in this embodiment as those in the method Embodiment 5, refer to corresponding steps in the method Embodiment 5.

In this embodiment, after determining that a measurement result of a target cell meets an entering condition of a measurement reporting event corresponding to indication information, a mobile terminal generates a measurement report of the measurement reporting event corresponding to the indication information, and then, the mobile terminal may establish a connection to the target cell. However, in the prior art, after the measurement result of the target cell meets an entering condition of a measurement reporting event, the mobile terminal generates a measurement report of the measurement reporting event, and then, sends the measurement report to an access network element corresponding to a serving cell, so as to wait for the access network element to deliver an indication that connection establishment is allowed. It can be learned, by comparing the prior art with this embodiment, that in this embodiment, provided that the measurement result of the target cell meets the entering condition of the measurement reporting event specified by the indication information and the mobile terminal generates the measurement report of the measurement reporting event specified by the indication information, the mobile terminal can establish a connection between the mobile terminal and the target cell in a timely manner, so that cell handover efficiency is improved and mobility of the mobile terminal is improved.

Figure 16:
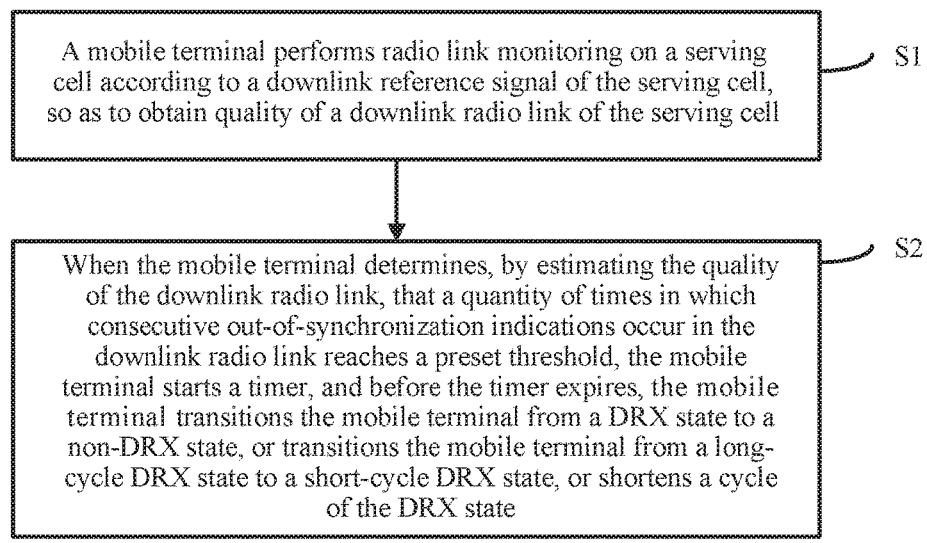
FIG. 16 is a schematic flowchart of Embodiment 1 of a method for controlling a DRX state of a mobile terminal according to the present invention.

FIG. 16 is a schematic flowchart of Embodiment 1 of a method for controlling a DRX state of a mobile terminal according to the present invention. As shown in FIG. 16, the method includes the following steps:

S1. A mobile terminal performs radio link monitoring RLM (Radio Link Monitoring) on a serving cell according to a downlink reference signal of the serving cell, so as to obtain quality of a downlink radio link of the serving cell.

S2. When the mobile terminal determines, by estimating the quality of the downlink radio link, that a quantity of times in which consecutive out-of-synchronization (out-of-sync) indications occur in the downlink radio link reaches a preset threshold, the mobile terminal starts a timer, and before the timer expires, the mobile terminal transitions the mobile terminal from a DRX state to a non-DRX state, or transitions the mobile terminal from a long-cycle DRX state to a short-cycle DRX state, or shortens a cycle of the DRX state.

The preset threshold is specifically a parameter (such as N310) configured by an access network element corresponding to the serving cell, and the timer may be a timer T310 or T312.

Specifically, when UE is in a DRX state, for time periods required by the UE for neighboring-cell discovery, RRM measurement, and radio link monitoring, reference may be specifically made to Table 1 (Requirement to identify a newly detectable FDD intrafrequency cell), Table 2 (Requirement to measure FDD intrafrequency cells), and Table 3 ($Q_{out}$ and $Q_{in}$ Evaluation Period in DRX) in the protocol 3GPP TS 36.133. Table 1, Table 2, and Table 3 are specifically as follows:

TABLE 1

| DRX CYCLE LENGTH (S) | $T_{IDENTIFY\_INFRA}$ (S) (DRX CYCLES) |
|---|---|
| ≤0.04 | 0.8 (NOTE1) (0.8 S) |
| 0.04 < DRX-CYCLE ≤ 0.08 | NOTE2 (40) |
| 0.128 | 3.2 (25) |
| 0.128 < DRX-CYCLE ≤ 2.56 | NOTE2 (20) |

NOTE1:
NUMBER OF DRX CYCLE DEPENDS UPON THE DRX CYCLE IN USE
NOTE2:
TIME DEPENDS UPON THE DRX CYCLE IN USE

TABLE 2

| DRX CYCLE LENGTH (S) | TMEASURE_INTRA (S) (DRX CYCLES) |
|---|---|
| ≤0.04 | 0.2 (NOTE1) |
| 0.04 < DRX-CYCLE ≤ 2.56 | NOTE2 (5) |

NOTE1:
NUMBER OF DRX CYCLE DEPENDS UPON THE DRX CYCLE IN USE
NOTE2:
TIME DEPENDS UPON THE DRX CYCLE IN USE

TABLE 3

| DRX CYCLE LENGTH (S) | TEVALUATE_QOUT_DRX AND TEVALUATE_QIN_DRX (S) (DRX CYCLES) |
|---|---|
| ≤0.01 | NON-DRX REQUIREMENTS IN SECTION 7.6.2.1 ARE APPLICABLE. |
| 0.01 < DRX CYCLE ≤ 0.04 | NOTE (20) |
| 0.04 < DRX CYCLE ≤ 0.64 | NOTE (10) |
| 0.64 < DRX CYCLE ≤ 2.56 | NOTE (5) |

NOTE:
EVALUATION PERIOD LENGTH IN TIME DEPENDS ON THE LENGTH OF THE DRX CYCLE IN USE

Table 3 is used as an example. For example, when the DRX cycle length (the cycle of a DRX state) is equal to 640 ms, the UE needs to spend 20 times the DRX cycle on new-cell discovery, 5 times the DRX cycle on RRM measurement, and 5 times the DRX cycle on RLM estimation (Qout and Qin Evaluation).

When the DRX cycle length is equal to 320 ms, the UE needs to spend 20 times the DRX cycle on neighboring-cell discovery, 5 times the DRX cycle on RRM measurement, and 10 times the DRX cycle on RLM estimation.

That is, if the DRX cycle is longer, the time periods required for RLM, RRM, and new-cell discovery are longer. However, in this embodiment, when determining that quality of a radio link is deteriorated, the mobile terminal may shorten the DRX cycle, so as to shorten the time periods spent on RLM, RRM, and new-cell discovery. In this way, the UE can discover a neighboring cell more quickly, and complete RRM measurement on the neighboring cell, so as to access a target cell more quickly.

Specifically, when performing S2 of shortening the DRX cycle, the DRX cycle may be specifically multiplied by a factor, so that a newly determined DRX cycle is shorter than the DLX cycle before S802. The factor may be previously delivered by the access network element corresponding to the serving cell, or may be predefined in a protocol, or may be associated with a mobility state estimation. For example, there is a mapping relationship between the mobility state estimation and the factor. When it is determined, according to the mobility state estimation, that the mobile terminal is in a high-mobility state, the factor is equal to 0.1; when it is determined that the mobile terminal is in a medium-mobility state, the factor is equal to 0.5; when it is determined that the mobile terminal is in a low-mobility state, the factor is equal to 1.

Optionally, before S1 is performed, a step that "the mobile terminal determines that the mobility state estimation of the mobile terminal meets a speed threshold specified by the mobile terminal" is further performed. Generally, if the mobile terminal moves at higher speed, a signal between the mobile terminal and the serving cell changes more greatly. When the mobile terminal is far from the serving cell, signal strength in the serving cell attenuates more quickly. In this case, once out-of-synchronization occurs in the radio link of the serving cell, the mobile terminal is more likely disconnected from the serving cell subsequently. Therefore, a higher speed indicates an increasing need to discover a neighboring cell in a timely manner and complete RRM measurement on the neighboring cell, so as to access the target cell more quickly. Therefore, when the mobility state estimation meets the speed threshold, for example, a high-mobility state, specified by the mobile terminal, by performing the S1 and S2, the mobile terminal transitions from a DRX state to a non-DRX (Non-DRX) state, or the mobile terminal transitions from a long-cycle DRX state and a short-cycle DRX state, or the mobile terminal shortens the DRX cycle, so as to accelerate RLM measurement, RRM measurement, or neighboring-cell discovery performed by the mobile terminal.

In this embodiment, when determining that quality of a radio link is deteriorated, a mobile terminal transitions the mobile terminal from a DILX state to a non-DRX state, or transitions the mobile terminal from a long-cycle DRX state to a short-cycle DRX state, or shortens a cycle of the DRX state, so as to shorten time periods spent on RLM, RRM, and neighboring-cell discovery. In this way, UE can discover a neighboring cell more quickly, and complete RRM measurement on the neighboring cell, so as to access a target cell more quickly.

Figure 17:
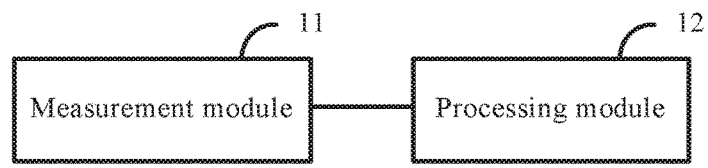
FIG. 17 is a schematic structural diagram of Embodiment 1 of a mobile terminal according to the present invention.

FIG. 17 is a schematic structural diagram of Embodiment 1 of a mobile terminal according to the present invention. As shown in FIG. 17, the mobile terminal includes:

a measurement module 11, configured to measure a target cell according to measurement configuration information, so as to obtain a measurement result of the target cell, where the measurement configuration information is obtained by the mobile terminal, by using a radio resource control RRC connection established between the mobile terminal and an access network element corresponding to a serving cell, from the access network element corresponding to the serving cell; and a processing module 12, configured to: initiate connection establishment to an access network element corresponding to the target cell when determining, according to the measurement result and indication information, that the measurement result meets an entering condition of a measurement reporting event corresponding to the indication information, where the indication information is used to instruct the processing module to initiate connection establishment to the access network element corresponding to the target cell if the measurement result meets the entering condition of the measurement reporting event corresponding to the indication information; or initiate connection establishment to an access network element corresponding to the target cell when generating a measurement report according to the measurement result, and determining that the measurement report is a measurement report of a measurement reporting event corresponding to indication information, where the indication information is used to instruct the processing module to initiate connection establishment to the access network element corresponding to the target cell if the processing module generates the measurement report of the measurement reporting event corresponding to the indication information; or initiate connection establishment to an access network element corresponding to the target cell when determining, according to the measurement result and indication information, that the measurement result meets an entering condition of a measurement reporting event corresponding to the indication information, and the processing module generates a measurement report of the measurement reporting event corresponding to the indication information, where the indication information is used to instruct the processing module to initiate connection establishment to the access network element corresponding to the target cell if the measurement result meets the entering condition of the measurement reporting event corresponding to the indication information and the processing module generates the measurement report of the measurement reporting event corresponding to the indication information, where the indication information is obtained by the processing module 12 in advance from the access network element corresponding to the serving cell.

In this embodiment, indication information is used to instruct a mobile terminal to initiate connection establishment to an access network element corresponding to a target cell if a measurement result meets an entering condition of a measurement reporting event corresponding to the indication information; or is used to instruct a mobile terminal to initiate connection establishment to an access network element corresponding to a target cell if the mobile terminal generates a measurement report of a measurement reporting event corresponding to the indication information; or is used to instruct a mobile terminal to initiate connection establishment to an access network element corresponding to a target cell if a measurement result meets an entering condition of a measurement reporting event corresponding to the indication information and the mobile terminal generates a measurement report of the measurement reporting event corresponding to the indication information. Therefore, when initiating connection establishment to the access network element corresponding to the target cell, the mobile terminal can at least skip sending, to an access network element corresponding to a serving cell, the measurement report of the measurement reporting event corresponding to the indication information, and directly initiate connection establishment to the access network element corresponding to the target cell, so that the mobile terminal can initiate, in a timely manner, connection establishment to the access network element corresponding to the target cell, and mobility of the mobile terminal is improved.

Figure 18:
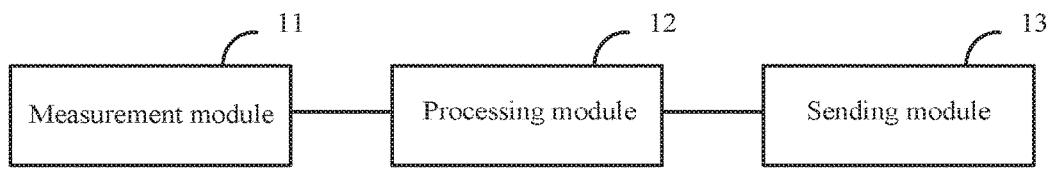
FIG. 18 is a schematic structural diagram of Embodiment 2 of a mobile terminal according to the present invention.

FIG. 18 is a schematic structural diagram of Embodiment 2 of a mobile terminal according to the present invention. As shown in FIG. 18, on the basis of the embodiment shown in FIG. 17, this embodiment gives a further description.

The processing module 12 is specifically configured to: skip sending, to the access network element corresponding to the serving cell, the measurement report of the measurement reporting event corresponding to the indication information, and initiate connection establishment to the access network element corresponding to the target cell.

Further, the processing module is further configured to receive, by using the RRC connection, the indication information sent by the access network element corresponding to the serving cell.

Further, if the indication information is used to instruct the mobile terminal to initiate connection establishment to the access network element corresponding to the target cell when the measurement result meets the entering condition of the measurement reporting event corresponding to the indication information and duration in which the measurement result meets the entering condition of the measurement reporting event corresponding to the indication information reaches predetermined duration, the processing module 12 is specifically configured to initiate connection establishment to the access network element corresponding to the target cell when determining, according to the measurement result and the indication information, that the measurement result meets the entering condition of the measurement reporting event corresponding to the indication information, and determining that the duration in which the measurement result meets the entering condition of the measurement reporting event corresponding to the indication information reaches the predetermined duration; or if the indication information is used to instruct the processing module to initiate connection establishment to the access network element corresponding to the target cell when the processing module generates the measurement report of the measurement reporting event corresponding to the indication information and duration after the measurement report of the measurement reporting event corresponding to the indication information is generated reaches predetermined duration, the processing module 12 is specifically configured to initiate connection establishment to the access network element corresponding to the target cell when generating the measurement report of the measurement reporting event corresponding to the indication information and determining that the duration after the measurement report of the measurement reporting event corresponding to the indication information is generated reaches the predetermined duration.

Further, the processing module 12 is specifically configured to: if it is determined that the mobile terminal is in a discontinuous reception DRX state, initiate connection establishment to the access network element corresponding to the target cell.

The DRX state is a short-cycle DRX state or a long-cycle DRX state.

Further, the processing module 12 is configured to: if it is determined that a mobility state estimation of the mobile terminal is greater than or equal to a speed threshold specified by the processing module, initiate connection establishment to the access network element corresponding to the target cell.

Further, the mobile terminal further includes: a sending module 13, configured to send the mobility state estimation of the mobile terminal to the access network element corresponding to the serving cell, where the indication information is sent after the access network element corresponding to the serving cell determines that the mobility state estimation is greater than or equal to a speed threshold specified by the access network element corresponding to the serving cell.

Further, the processing module 12 is specifically configured to initiate a random access process to the target cell, and/or any one of the following processing:

initiating, by the mobile terminal to the target cell, an RRC connection re-establishment process, a cell update process, an RRC connection establishment process, or a forward handover process.

Further, the processing module 12 is further configured to remain connected to the access network element corresponding to the serving cell.

In this embodiment, due to indication information, when initiating connection establishment to an access network element corresponding to a target cell, a mobile terminal can at least skip sending, to an access network element corresponding to a serving cell, a measurement report of a measurement reporting event corresponding to the indication information, and directly initiate connection establishment to the access network element corresponding to the target cell, so that the mobile terminal can initiate, in a timely manner, connection establishment to the access network element corresponding to the target cell, and mobility of the mobile terminal is improved.

Figure 19:
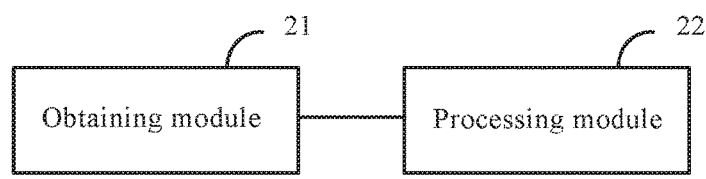
FIG. 19 is a schematic structural diagram of Embodiment 3 of a mobile terminal according to the present invention.

FIG. 19 is a schematic structural diagram of Embodiment 3 of a mobile terminal according to the present invention. As shown in FIG. 19, the mobile terminal includes:

an obtaining module 21, configured to perform radio link monitoring RLM on a serving cell according to a downlink reference signal of the serving cell, so as to obtain quality of a downlink radio link of the serving cell; and a processing module 22, configured to: when determining, by estimating the quality of the downlink radio link, that a quantity of times in which consecutive out-of-synchronization indications occur in the downlink radio link reaches a preset threshold, start a timer, and before the timer expires, transition the mobile terminal from a DRX state to a non-DRX state, or transition the mobile terminal from a long-cycle DRX state to a short-cycle DRX state, or shorten a cycle of the DRX state.

Further, the processing module 22 is further configured to determine that a mobility state estimation of the mobile terminal meets a speed threshold specified by the processing module.

The timer is a timer T310 or a timer T312.

In this embodiment, after determining that a measurement result of a target cell meets an entering condition of a measurement reporting event corresponding to indication information, a mobile terminal generates a measurement report of the measurement reporting event corresponding to the indication information, and then, the mobile terminal may establish a connection to the target cell. However, in the prior art, after the measurement result of the target cell meets an entering condition of a measurement reporting event, the mobile terminal generates a measurement report of the measurement reporting event, and then, sends the measurement report to an access network element corresponding to a serving cell, so as to wait for the access network element to deliver an indication that connection establishment is allowed. It can be learned, by comparing the prior art with this embodiment, that in this embodiment, provided that the measurement result of the target cell meets the entering condition of the measurement reporting event specified by the indication information and the mobile terminal generates the measurement report of the measurement reporting event specified by the indication information, the mobile terminal can establish a connection between the mobile terminal and the target cell in a timely manner, so that cell handover efficiency is improved and mobility of the mobile terminal is improved.

Figure 20:
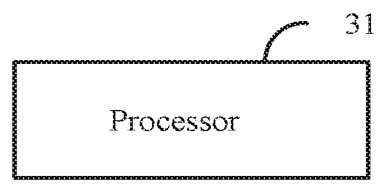
FIG. 20 is a schematic structural diagram of Embodiment 4 of a mobile terminal according to the present invention.

FIG. 20 is a schematic structural diagram of Embodiment 4 of a mobile terminal according to the present invention. As shown in FIG. 20, the mobile terminal includes:

a processor 31, configured to: measure a target cell according to measurement configuration information, so as to obtain a measurement result of the target cell, where the measurement configuration information is obtained by the mobile terminal, by using a radio resource control RRC connection established between the mobile terminal and an access network element corresponding to a serving cell, from the access network element corresponding to the serving cell; and initiate connection establishment to an access network element corresponding to the target cell when determining, according to the measurement result and indication information, that the measurement result meets an entering condition of a measurement reporting event corresponding to the indication information, where the indication information is used to instruct the processor to initiate connection establishment to the access network element corresponding to the target cell if the measurement result meets the entering condition of the measurement reporting event corresponding to the indication information; or initiate connection establishment to an access network element corresponding to the target cell when generating a measurement report according to the measurement result, and determining that the measurement report is a measurement report of a measurement reporting event corresponding to indication information, where the indication information is used to instruct the processor to initiate connection establishment to the access network element corresponding to the target cell if the processor generates the measurement report of the measurement reporting event corresponding to the indication information; or initiate connection establishment to an access network element corresponding to the target cell when determining, according to the measurement result and indication information, that the measurement result meets an entering condition of a measurement reporting event corresponding to the indication information, and the processor generates a measurement report of the measurement reporting event corresponding to the indication information, where the indication information is used to instruct the processor to initiate connection establishment to the access network element corresponding to the target cell if the measurement result meets the entering condition of the measurement reporting event corresponding to the indication information and the processor generates the measurement report of the measurement reporting event corresponding to the indication information, where the indication information is obtained by the processor in advance from the access network element corresponding to the serving cell.

In this embodiment, indication information is used to instruct a mobile terminal to initiate connection establishment to an access network element corresponding to a target cell if a measurement result meets an entering condition of a measurement reporting event corresponding to the indication information; or is used to instruct a mobile terminal to initiate connection establishment to an access network element corresponding to a target cell if the mobile terminal generates a measurement report of a measurement reporting event corresponding to the indication information; or is used to instruct a mobile terminal to initiate connection establishment to an access network element corresponding to a target cell if a measurement result meets an entering condition of a measurement reporting event corresponding to the indication information and the mobile terminal generates a measurement report of the measurement reporting event corresponding to the indication information. Therefore, when initiating connection establishment to the access network element corresponding to the target cell, the mobile terminal can at least skip sending, to an access network element corresponding to a serving cell, the measurement report of the measurement reporting event corresponding to the indication information, and directly initiate connection establishment to the access network element corresponding to the target cell, so that the mobile terminal can initiate, in a timely manner, connection establishment to the access network element corresponding to the target cell, and mobility of the mobile terminal is improved.

Figure 21:
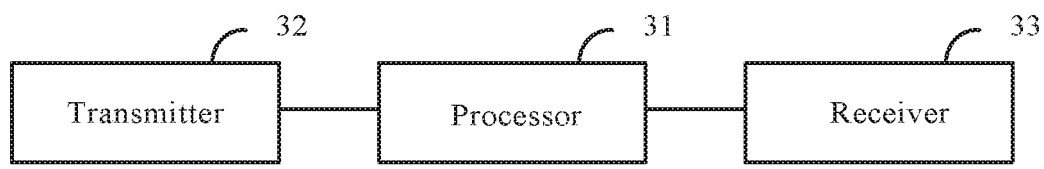
FIG. 21 is a schematic structural diagram of Embodiment 5 of a mobile terminal according to the present invention.

FIG. 21 is a schematic structural diagram of Embodiment 5 of a mobile terminal according to the present invention. As shown in FIG. 21, on the basis of the embodiment shown in FIG. 20, this embodiment gives a further description, and the mobile terminal further includes:

a transmitter 32; and the processor 31 is specifically configured to: control the transmitter 32 to skip sending, to the access network element corresponding to the serving cell, the measurement report of the measurement reporting event corresponding to the indication information, and initiate connection establishment to the access network element corresponding to the target cell.

Further, the mobile terminal further includes: a receiver 33, configured to receive, by using the RRC connection, the indication information sent by the access network element corresponding to the serving cell.

Further, if the indication information is used to instruct the processor 31 to initiate connection establishment to the access network element corresponding to the target cell when the measurement result meets the entering condition of the measurement reporting event corresponding to the indication information and duration in which the measurement result meets the entering condition of the measurement reporting event corresponding to the indication information reaches predetermined duration, the processor 31 is specifically configured to initiate connection establishment to the access network element corresponding to the target cell when determining, according to the measurement result and the indication information, that the measurement result meets the entering condition of the measurement reporting event corresponding to the indication information, and determining that the duration in which the measurement result meets the entering condition of the measurement reporting event corresponding to the indication information reaches the predetermined duration; or if the indication information is used to instruct the processor 31 to initiate connection establishment to the access network element corresponding to the target cell when the processor 31 generates the measurement report of the measurement reporting event corresponding to the indication information and duration after the measurement report of the measurement reporting event corresponding to the indication information is generated reaches predetermined duration, the processor 31 is specifically configured to initiate connection establishment to the access network element corresponding to the target cell when generating the measurement report of the measurement reporting event corresponding to the indication information and determining that the duration after the measurement report of the measurement reporting event corresponding to the indication information is generated reaches the predetermined duration.

Further, the processor 31 is specifically configured to: if it is determined that the mobile terminal is in a discontinuous reception DRX state, initiate connection establishment to the access network element corresponding to the target cell.

The DRX state is a short-cycle DRX state or a long-cycle DRX state.

Further, the processor 31 is configured to: if it is determined that a mobility state estimation of the mobile terminal is greater than or equal to a speed threshold specified by the processor, initiate connection establishment to the access network element corresponding to the target cell.

Further, the transmitter 32 is further configured to send the mobility state estimation of the mobile terminal to the access network element corresponding to the serving cell, where the indication information is sent after the access network element corresponding to the serving cell determines that the mobility state estimation is greater than or equal to a speed threshold specified by the access network element corresponding to the serving cell.

Further, the processor 31 is specifically configured to initiate a random access process to the target cell, and/or any one of the following processing:

initiating, by the mobile terminal to the target cell, an RRC connection re-establishment process, a cell update process, an RRC connection establishment process, or a forward handover process.

Further, the processor 12 is further configured to remain connected to the access network element corresponding to the serving cell.

Figure 22:
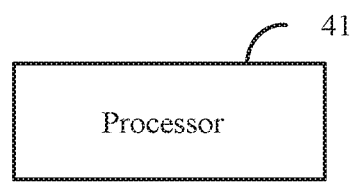
FIG. 22 is a schematic structural diagram of Embodiment 6 of a mobile terminal according to the present invention.

FIG. 22 is a schematic structural diagram of Embodiment 6 of a mobile terminal according to the present invention. As shown in FIG. 22, the mobile terminal includes:

a processor 41, configured to: perform radio link monitoring RLM on a serving cell according to a downlink reference signal of the serving cell, so as to obtain quality of a downlink radio link of the serving cell; and when determining, by estimating the quality of the downlink radio link, that a quantity of times in which consecutive out-of-synchronization indications occur in the downlink radio link reaches a preset threshold, start a timer, and before the timer expires, transition the mobile terminal from a DRX state to a non-DRX state, or transition the mobile terminal from a long-cycle DRX state to a short-cycle DRX state, or shorten a cycle of the DRX state.

Further, the processor 41 is further configured to determine that a mobility state estimation of the mobile terminal meets a speed threshold specified by the processor.

The timer is a timer T310 or a timer T312.

In this embodiment, after determining that a measurement result of a target cell meets an entering condition of a measurement reporting event corresponding to indication information, a mobile terminal generates a measurement report of the measurement reporting event corresponding to the indication information, and then, the mobile terminal may establish a connection to the target cell. However, in the prior art, after the measurement result of the target cell meets an entering condition of a measurement reporting event, the mobile terminal generates a measurement report of the measurement reporting event, and then, sends the measurement report to an access network element corresponding to a serving cell, so as to wait for the access network element to deliver an indication that connection establishment is allowed. It can be learned, by comparing the prior art with this embodiment, that in this embodiment, provided that the measurement result of the target cell meets the entering condition of the measurement reporting event specified by the indication information and the mobile terminal generates the measurement report of the measurement reporting event specified by the indication information, the mobile terminal can establish a connection between the mobile terminal and the target cell in a timely manner, so that cell handover efficiency is improved and mobility of the mobile terminal is improved.

It should be noted that, in the mobile terminal embodiments shown in FIG. 17 to FIG. 22, various modules or components correspond one-to-one to various steps in the foregoing method embodiments. For specific working processes and technical effects of the modules or components, reference may be made to the foregoing method embodiments.

Persons of ordinary skill in the art may understand that all or some of the steps of the method embodiments may be implemented by a program instructing relevant hardware. The program may be stored in a computer readable storage medium. When the program runs, the steps of the method embodiments are performed. The storage medium includes: any medium that can store program code, such as a ROM, a RAM, a magnetic disk, or an optical disc.

What is claimed is:

1. A method, comprising:

obtaining, by a mobile terminal, a measurement result of a target cell by measuring the target cell according to measurement configuration information, wherein the measurement configuration information is obtained by the mobile terminal, by using a radio resource control (RRC) connection established between the mobile terminal and an access network element corresponding to a serving cell, from the access network element corresponding to the serving cell; and determining, by the mobile terminal according to the measurement result and indication information, that the measurement result meets an entering condition of a measurement reporting event corresponding to the indication information, and in response, initiating, by the mobile terminal, connection establishment to an access network element corresponding to the target cell, wherein the indication information is used to instruct the mobile terminal to initiate connection establishment to the access network element corresponding to the target cell; or determining, by the mobile terminal, that the mobile terminal generates a measurement report according to the measurement result and that the measurement report is a measurement report of a measurement reporting event corresponding to indication information, and in response, initiating, by the mobile terminal, connection establishment to an access network element corresponding to the target cell, wherein the indication information is used to instruct the mobile terminal to initiate connection establishment to the access network element corresponding to the target cell; or determining, by the mobile terminal, according to the measurement result and indication information that the measurement result meets an entering condition of a measurement reporting event corresponding to the indication information, and that the mobile terminal generates a measurement report of the measurement reporting event corresponding to the indication information, and in response, initiating, by the mobile terminal, connection establishment to an access network element corresponding to the target cell, wherein the indication information is used to instruct the mobile terminal to initiate connection establishment to the access network element corresponding to the target cell.

2. The method according to claim 1, wherein initiating, by the mobile terminal, connection establishment to an access network element corresponding to the target cell comprises:

skipping, by the mobile terminal, sending, to the access network element corresponding to the serving cell, the measurement report of the measurement reporting event corresponding to the indication information, and initiating connection establishment to the access network element corresponding to the target cell.

3. The method according to claim 1, wherein:

when it is determined that the measurement result meets the entering condition of the measurement reporting event corresponding to the indication information, initiating, by the mobile terminal, connection establishment to an access network element corresponding to the target cell comprises:
    initiating, by the mobile terminal, connection establishment to the access network element corresponding to the target cell when the mobile terminal determines that a duration in which the measurement result meets the entering condition of the measurement reporting event corresponding to the indication information reaches a predetermined duration; or
when it is determined that the mobile terminal generates the measurement report of the measurement reporting event corresponding to the indication information, initiating, by the mobile terminal, connection establishment to an access network element corresponding to the target cell comprises:
    initiating, by the mobile terminal, connection establishment to the access network element corresponding to the target cell when the mobile terminal determines that a duration after the measurement report of the measurement reporting event corresponding to the indication information is generated reaches a predetermined duration.

4. The method according to claim 1, wherein initiating, by the mobile terminal, connection establishment to an access network element corresponding to the target cell comprises:
    when the mobile terminal is in a discontinuous reception (DRX) state, initiating, by the mobile terminal, connection establishment to the access network element corresponding to the target cell.

5. The method according to claim 4, wherein the DRX state is a short-cycle DRX state or a long-cycle DRX state.

6. The method according to claim 1, wherein initiating, by the mobile terminal, connection establishment to an access network element corresponding to the target cell comprises:
    when a mobility state estimation of the mobile terminal is greater than or equal to a speed threshold, initiating, by the mobile terminal, connection establishment to the access network element corresponding to the target cell.

7. The method according to claim 1, further comprising:
    sending, by the mobile terminal, a mobility state estimation of the mobile terminal to the access network element corresponding to the serving cell; and
    receiving, by the mobile terminal, the indication information after the access network element corresponding to the serving cell determines that the mobility state estimation is greater than or equal to a speed threshold specified by the access network element corresponding to the serving cell.

8. The method according to claim 1, wherein initiating, by the mobile terminal, connection establishment to an access network element corresponding to the target cell comprises:
    initiating, by the mobile terminal to the target cell, at least one of: a random access process, an RRC connection re-establishment process, a cell update process, an RRC connection establishment process, or a forward handover process.

9. An apparatus, comprising:
    a storage medium comprising processor-executable instructions; and
    a processor coupled to the storage medium, wherein the processor-executable instructions, when executed by the processor, cause the apparatus to:
        obtain a measurement result of a target cell by measuring the target cell according to measurement configuration information, wherein the measurement configuration information is obtained by a mobile terminal, by using a radio resource control (RRC) connection established between the mobile terminal and an access network element corresponding to a serving cell, from the access network element corresponding to the serving cell, and
        determine, according to the measurement result and indication information, that the measurement result meets an entering condition of a measurement reporting event corresponding to the indication information, and in response, initiate connection establishment to an access network element corresponding to the target cell, wherein the indication information is used to instruct to initiate connection establishment to the access network element corresponding to the target cell, or
        determine that a measurement report is generated according to the measurement result and that the measurement report is a measurement report of a measurement reporting event corresponding to indication information, and in response, initiate connection establishment to an access network element corresponding to the target cell, wherein the indication information is used to instruct to initiate connection establishment to the access network element corresponding to the target cell, or
        determine according to the measurement result and indication information, that the measurement result meets an entering condition of a measurement reporting event corresponding to the indication information, and that a measurement report of the measurement reporting event corresponding to the indication information is generated, and in response, initiate connection establishment to an access network element corresponding to the target cell, wherein the indication information is used to instruct to initiate connection establishment to the access network element corresponding to the target cell.

10. The apparatus according to claim 9, wherein to initiate connection establishment to an access network element corresponding to the target cell, the processor-executable instructions, when executed by the processor, further cause the apparatus to:
    skip sending, to the access network element corresponding to the serving cell, the measurement report of the measurement reporting event corresponding to the indication information, and initiate connection establishment to the access network element corresponding to the target cell.

11. The apparatus according to claim 9, wherein:
when it is determined that the measurement result meets the entering condition of the measurement reporting event corresponding to the indication information, to initiate connection establishment to an access network element corresponding to the target cell, the processor-executable instructions, when executed by the processor, further cause the apparatus to:
    initiate connection establishment to the access network element corresponding to the target cell when a duration in which the measurement result meets the entering condition of the measurement reporting event corresponding to the indication information reaches a predetermined duration; or
when it is determined that the measurement report is generated according to the measurement result and the measurement report is a measurement report of a measurement reporting event, the processor-executable instructions, when executed by the processor, further cause the apparatus to:
  initiate connection establishment to the access network element corresponding to the target cell when a duration after the measurement report of the measurement reporting event corresponding to the indication information is generated reaches a predetermined duration.

12. The apparatus according to claim 9, wherein to initiate connection establishment to an access network element corresponding to the target cell, the processor-executable instructions, when executed by the processor, further cause the apparatus to:
  when the apparatus is in a discontinuous reception (DRX) state, initiate connection establishment to the access network element corresponding to the target cell.

13. The apparatus according to claim 12, wherein the DRX state is a short-cycle DRX state or a long-cycle DRX state.

14. The apparatus according to claim 9, wherein to initiate connection establishment to an access network element corresponding to the target cell, the processor-executable instructions, when executed by the processor, further cause the apparatus to:
  when a mobility state estimation of the apparatus is greater than or equal to a speed threshold, initiate connection establishment to the access network element corresponding to the target cell.

15. The apparatus according to claim 9, wherein the processor-executable instructions, when executed by the processor, cause the apparatus to:
  send a mobility state estimation of the apparatus to the access network element corresponding to the serving cell; and
  receive the indication information after the access network element corresponding to the serving cell determines that the mobility state estimation is greater than or equal to a speed threshold.

16. The apparatus according to claim 9, wherein to initiate connection establishment to an access network element corresponding to the target cell, the processor-executable instructions, when executed by the processor, cause the apparatus to:
  initiate to the target cell, at least one of: a random access process, an RRC connection re-establishment process, a cell update process, an RRC connection establishment process, or a forward handover process.

* * * * *